(12) United States Patent
Ichii

(10) Patent No.: US 8,094,179 B2
(45) Date of Patent: Jan. 10, 2012

(54) LIGHT SOURCE DEVICE, OPTICAL SCANNING DEVICE, AND IMAGE FORMING APPARATUS

(75) Inventor: Daisuke Ichii, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/021,077

(22) Filed: Feb. 4, 2011

(65) Prior Publication Data

US 2011/0205325 A1 Aug. 25, 2011

(30) Foreign Application Priority Data

Feb. 19, 2010 (JP) ................. 2010-034357

(51) Int. Cl.
*B41J 27/00* (2006.01)
(52) U.S. Cl. ......... 347/256; 347/241; 347/242; 347/243
(58) Field of Classification Search .......... 347/241–243, 347/256
See application file for complete search history.

(56) References Cited

U.S. PATENT DOCUMENTS

| | | | |
|---|---|---|---|
| 7,218,432 B2 | 5/2007 | Ichii et al. | |
| 7,417,777 B2 | 8/2008 | Saisho et al. | |
| 7,443,558 B2 | 10/2008 | Sakai et al. | |
| 7,511,868 B2 | 3/2009 | Nakajima | |
| 7,545,547 B2 | 6/2009 | Hayashi et al. | |
| 7,554,708 B2 | 6/2009 | Sakai et al. | |
| 7,586,661 B2 | 9/2009 | Ichii | |
| 7,623,280 B2 | 11/2009 | Hirakawa et al. | |
| 7,626,744 B2 | 12/2009 | Arai et al. | |
| 7,663,657 B2 | 2/2010 | Ichii et al. | |
| 7,672,032 B2 | 3/2010 | Hayashi et al. | |
| 7,687,762 B2 | 3/2010 | Watanabe et al. | |
| 7,738,007 B2 | 6/2010 | Ichii et al. | |
| 7,800,805 B2 | 9/2010 | Hayashi et al. | |
| 2007/0211325 A1 | 9/2007 | Ichii | |
| 2007/0253047 A1 | 11/2007 | Ichii et al. | |
| 2007/0253048 A1 | 11/2007 | Sakai et al. | |
| 2008/0055672 A1 | 3/2008 | Watanabe et al. | |
| 2008/0068690 A1 | 3/2008 | Ichii | |
| 2008/0123159 A1 | 5/2008 | Hayashi et al. | |

(Continued)

FOREIGN PATENT DOCUMENTS

JP 2002-40350 2/2002

(Continued)

OTHER PUBLICATIONS

U.S. Appl. No. 13/015,252, filed Jan. 27, 2011, Ichii.

*Primary Examiner* — Stephen Meier
*Assistant Examiner* — Sarah Al Hashimi
(74) *Attorney, Agent, or Firm* — Oblon, Spivak, McClelland, Maier & Neustadt, L.L.P.

(57) ABSTRACT

A light source device includes a light source, a coupling lens, a first opening plate, a second opening plate, a photoreceptor, a package member, a cover glass, a half mirror, and a light source control device. In relation to a main-scanning corresponding direction and a sub-scanning corresponding direction, divergence angles $\theta m$ and $\theta s$ of a light beam output from the light source, emission angles $\theta m1$ and $\theta s1$ of a light beam passing through an opening portion A, and emission angles $\theta m2$ and $\theta s2$ of a light beam passing through an opening portion B satisfy relationships $|(\theta m1-\theta m2)/\theta m| \leq 0.085$ and $|(\theta s1-\theta s2)/\theta s| \leq 0.085$.

13 Claims, 27 Drawing Sheets

U.S. PATENT DOCUMENTS

| | | |
|---|---|---|
| 2008/0151366 A1* | 6/2008 | Araya et al. ............ 359/385 |
| 2008/0191604 A1* | 8/2008 | Morris et al. ............ 313/499 |
| 2008/0192319 A1 | 8/2008 | Miyatake et al. |
| 2008/0212999 A1 | 9/2008 | Masuda et al. |
| 2008/0267663 A1 | 10/2008 | Ichii et al. |
| 2009/0175657 A1 | 7/2009 | Yoshii et al. |
| 2009/0195849 A1 | 8/2009 | Ichii et al. |
| 2009/0295900 A1 | 12/2009 | Ichii |
| 2009/0315967 A1 | 12/2009 | Hayashi et al. |
| 2010/0060712 A1 | 3/2010 | Sato et al. |
| 2010/0195681 A1 | 8/2010 | Tatsuno et al. |
| 2010/0214633 A1 | 8/2010 | Sato et al. |
| 2011/0199454 A1* | 8/2011 | Ichii ............ 347/224 |

FOREIGN PATENT DOCUMENTS

| | | |
|---|---|---|
| JP | 2007-79295 | 3/2007 |
| JP | 2009-65064 | 3/2009 |

\* cited by examiner

FIG.6A
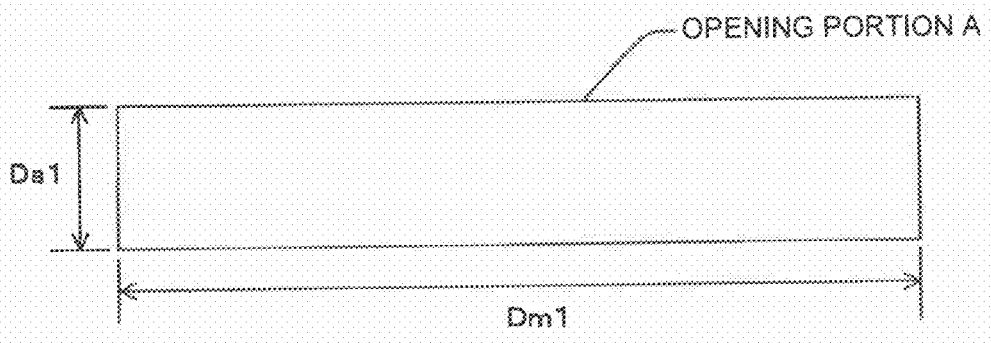
OPENING PORTION A
Ds1, Dm1
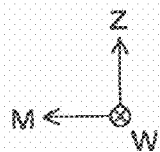
FIG.6B
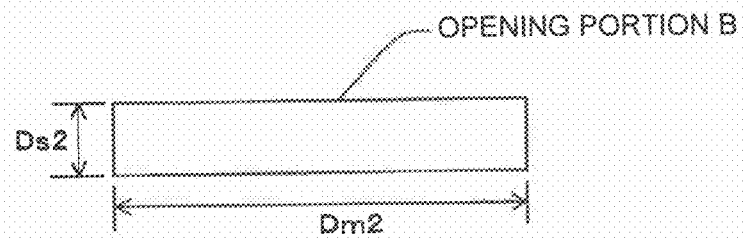
OPENING PORTION B
Ds2, Dm2
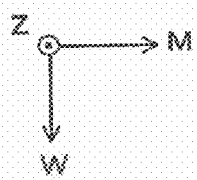

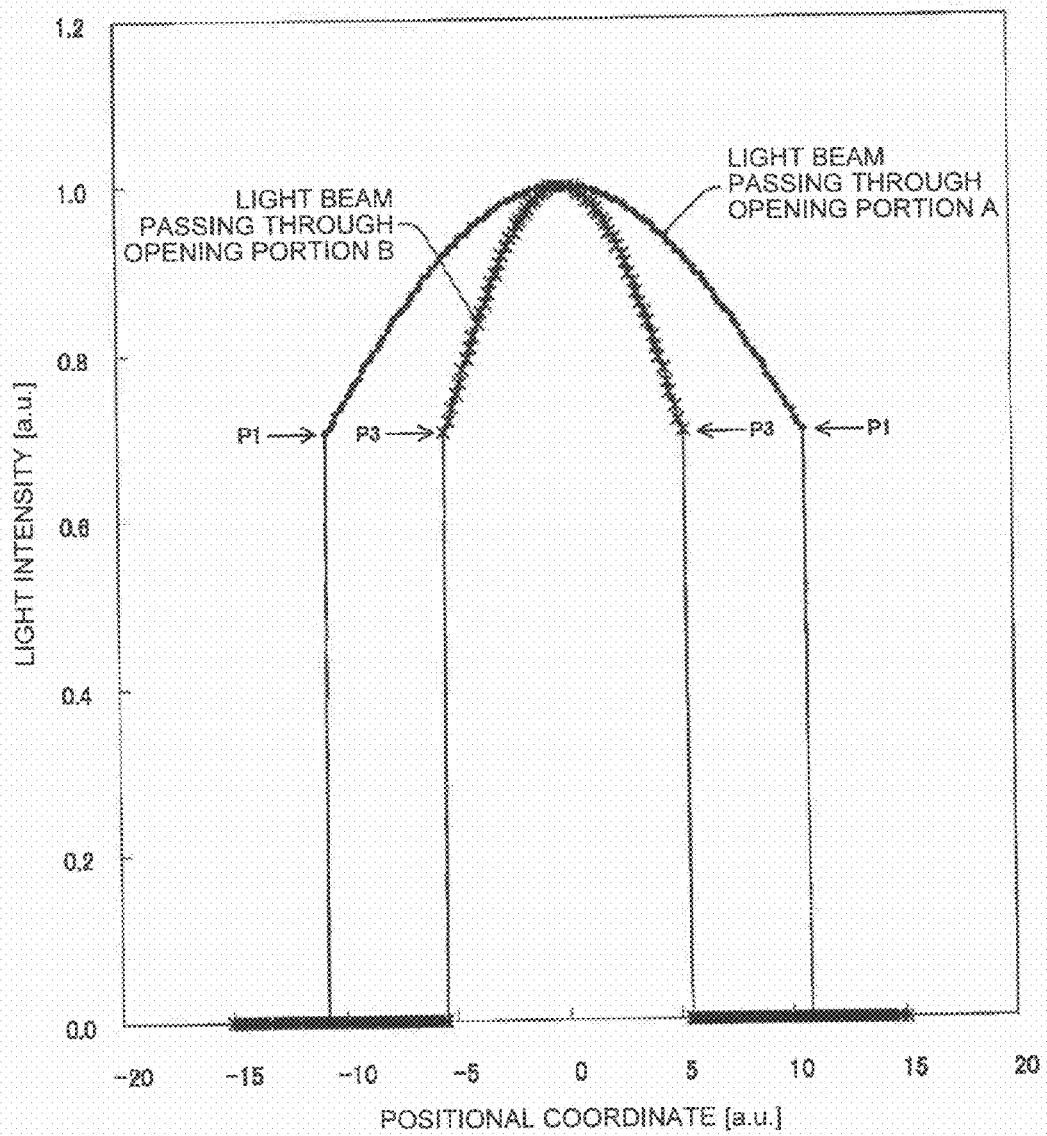

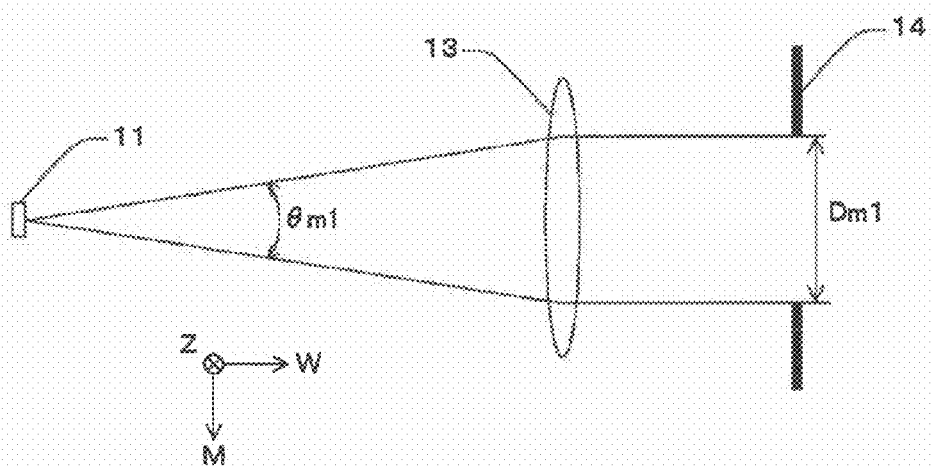
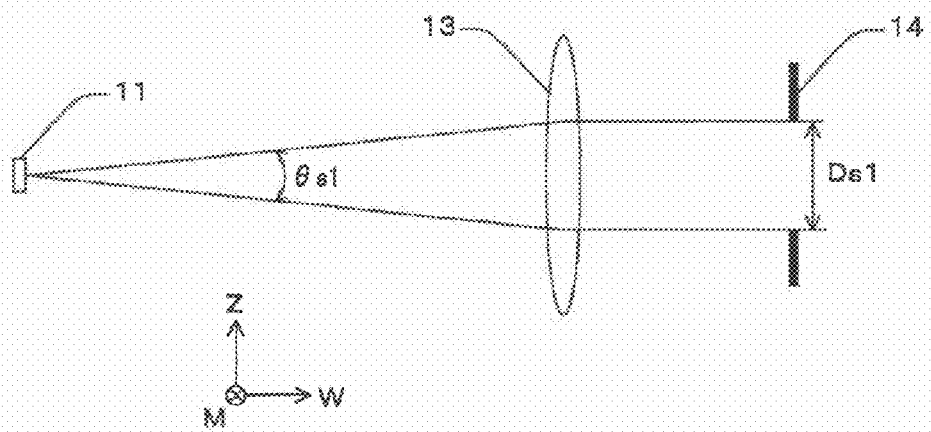

FIG.14A

| θ m [deg.] | 7.00 |
|---|---|
| θ s [deg.] | 7.00 |
| L1 [mm] | 45.00 |
| Dm1 [mm] | 5.60 |
| Ds1 [mm] | 1.18 |
| θ m1 [deg.] | 7.12 |
| θ s1 [deg.] | 1.50 |
| L2 [mm] | 34.78 |

FIG.14B

| θ m [deg.] | 14.00 |
|---|---|
| θ s [deg.] | 8.00 |
| L1 [mm] | 35.00 |
| Dm1 [mm] | 5.00 |
| Ds1 [mm] | 1.50 |
| θ m1 [deg.] | 8.17 |
| θ s1 [deg.] | 2.46 |
| L2 [mm] | 34.78 |

FIG.14C

| θ m [deg.] | 20.00 |
|---|---|
| θ s [deg.] | 11.00 |
| L1 [mm] | 15.00 |
| Dm1 [mm] | 3.40 |
| Ds1 [mm] | 1.60 |
| θ m1 [deg.] | 12.93 |
| θ s1 [deg.] | 6.11 |
| L2 [mm] | 25.00 |

FIG.14D

| θ m [deg.] | 10.00 |
|---|---|
| θ s [deg.] | 10.00 |
| L1 [mm] | 27.00 |
| Dm1 [mm] | 4.50 |
| Ds1 [mm] | 3.00 |
| θ m1 [deg.] | 9.53 |
| θ s1 [deg.] | 6.36 |
| L2 [mm] | 25.00 |

FIG.15

| | | Jm | | | | | | | | |
|---|---|---|---|---|---|---|---|---|---|---|
| | | 0.338 | 0.253 | 0.169 | 0.085 | 0.000 | -0.085 | -0.170 | -0.254 | -0.339 |
| Js | 0.338 + | 7.1 | 6.4 | 5.5 | 4.4 | 3.3 | 2.2 | 1.1 | 0.2 | -0.5 |
| | 0.338 − | -6.3 | -5.5 | -4.6 | -3.6 | -2.6 | -1.7 | -0.8 | 0.1 | 0.4 |
| | 0.254 + | 6.1 | 5.3 | 4.4 | 3.4 | 2.3 | 1.1 | 0.0 | -0.9 | -1.6 |
| | 0.254 − | -5.4 | -4.6 | -3.7 | -2.7 | -1.7 | -0.8 | 0.0 | 0.7 | -1.3 |
| | 0.169 + | 5.2 | 4.4 | 3.5 | 2.4 | 1.3 | 0.1 | -0.9 | -1.9 | -2.6 |
| | 0.169 − | -4.6 | -3.8 | -2.9 | -2.0 | -1.0 | -0.1 | 0.8 | 1.5 | 2.0 |
| | 0.085 + | 4.4 | 3.7 | 2.7 | 1.7 | 0.5 | -0.6 | -1.7 | -2.7 | -3.4 |
| | 0.085 − | -4.0 | -3.2 | -2.3 | -1.4 | -0.4 | 0.5 | 1.4 | 2.1 | 2.6 |
| | 0.000 + | 3.9 | 3.2 | 2.2 | 1.1 | 0.0 | -1.2 | -2.3 | -3.2 | -4.0 |
| | 0.000 − | -3.6 | -2.8 | -1.9 | -1.0 | 0.0 | 0.9 | 1.8 | 2.5 | 3.0 |
| | -0.085 + | 3.7 | 2.9 | 2.0 | 0.8 | -0.2 | -1.4 | -2.5 | -3.5 | -4.2 |
| | -0.085 − | -3.4 | -2.6 | -1.7 | -0.8 | 0.2 | 1.1 | 1.9 | 2.6 | 3.1 |
| | -0.169 +/− | | | | | | | | | |
| | -0.254 +/− | | | | | | | | | |
| | -0.338 +/− | | | | | | | | | |

FIG.16

| | | | \multicolumn{9}{c}{Jm} |
|---|---|---|---|---|---|---|---|---|---|---|
| | | | 0.338 | 0.253 | 0.169 | 0.085 | 0.000 | -0.085 | -0.170 | -0.255 | -0.340 |
| Js | 0.337 | + | 10.8 | 9.8 | 8.7 | 7.7 | 6.8 | 6.0 | 5.5 | 5.2 | |
| | | − | -9.8 | -8.8 | -7.8 | -6.7 | -5.8 | -5.2 | -4.7 | -4.5 | |
| | 0.253 | + | 9.2 | 8.1 | 7.1 | 6.0 | 5.1 | 4.3 | 3.7 | 3.5 | |
| | | − | -7.9 | -6.9 | -5.9 | -5.0 | -4.2 | -3.5 | -3.1 | -2.9 | |
| | 0.169 | + | 7.3 | 6.3 | 5.2 | 4.1 | 3.1 | 2.3 | 1.9 | 1.6 | |
| | | − | -6.2 | -5.2 | -4.2 | -3.3 | -2.3 | -1.8 | -1.4 | -1.2 | |
| | 0.085 | + | 5.6 | 4.5 | 3.4 | 2.3 | 1.3 | 0.5 | -0.1 | -0.4 | |
| | | − | -4.6 | -3.7 | -2.7 | -1.8 | -1.0 | -0.4 | 0.1 | 0.3 | |
| | 0.000 | + | 4.3 | 3.2 | 2.1 | 1.0 | 0.0 | -0.8 | -1.4 | -1.7 | |
| | | − | -3.6 | -2.6 | -1.7 | -0.8 | 0.0 | 0.6 | 1.0 | 1.3 | |
| | -0.085 | + | 3.8 | 2.7 | 1.6 | 0.5 | -0.5 | -1.3 | -1.9 | -2.2 | |
| | | − | -3.2 | -2.2 | -1.3 | -0.4 | 0.4 | 1.0 | 1.4 | 1.6 | |
| | -0.169 | + | | | | | | | | | |
| | | − | | | | | | | | | |
| | -0.254 | + | | | | | | | | | |
| | | − | | | | | | | | | |
| | -0.338 | + | | | | | | | | | |
| | | − | | | | | | | | | |

FIG.17

|  |  |  | Jm | | | | | | | | |
|---|---|---|---|---|---|---|---|---|---|---|---|
|  |  |  | 0.334 | 0.252 | 0.168 | 0.085 | 0.000 | -0.085 | -0.171 | -0.257 | -0.343 |
| Js | 0.335 | + | 11.0 | 10.1 | 9.0 | 8.0 | 7.0 | 6.2 | 5.5 | 5.2 |  |
|  |  | − | -10.2 | -9.2 | -8.2 | -7.2 | -6.4 | -5.6 | -5.1 | -4.8 |  |
|  | 0.252 | + | 9.8 | 8.8 | 7.8 | 6.7 | 5.7 | 4.8 | 4.2 | 3.8 |  |
|  |  | − | -8.7 | -7.8 | -6.7 | -5.8 | -4.9 | -4.2 | -3.7 | -3.4 |  |
|  | 0.169 | + | 8.1 | 7.1 | 6.0 | 4.9 | 3.9 | 3.0 | 2.4 | 2.0 |  |
|  |  | − | -7.0 | -6.0 | -5.0 | -4.1 | -3.2 | -2.5 | -2.0 | -1.7 |  |
|  | 0.085 | + | 6.1 | 5.1 | 4.0 | 2.9 | 1.9 | 1.0 | 0.3 | -0.1 |  |
|  |  | − | -5.2 | -4.2 | -3.2 | -2.3 | -1.5 | -0.8 | -0.3 | -0.0 |  |
|  | 0.000 | + | 4.3 | 3.3 | 2.2 | 1.1 | 0.0 | -0.9 | -1.6 | -2.0 |  |
|  |  | − | -3.6 | -2.7 | -1.7 | -0.8 | 0.0 | 0.7 | 1.2 | 1.5 |  |
|  | -0.085 | + | 3.1 | 2.1 | 1.0 | -0.2 | -1.2 | -2.2 | -2.9 | -3.3 |  |
|  |  | − | -2.7 | -1.7 | -0.8 | 0.1 | 0.9 | 1.6 | 2.1 | 2.4 |  |
|  | -0.170 | + |  |  |  |  |  |  |  |  |  |
|  |  | − |  |  |  |  |  |  |  |  |  |
|  | -0.255 | + |  |  |  |  |  |  |  |  |  |
|  |  | − |  |  |  |  |  |  |  |  |  |
|  | -0.340 | + |  |  |  |  |  |  |  |  |  |
|  |  | − |  |  |  |  |  |  |  |  |  |

FIG.18

|  |  |  | Jm | | | | | | | | |
|---|---|---|---|---|---|---|---|---|---|---|---|
|  |  |  | 0.337 | 0.253 | 0.169 | 0.085 | 0.000 | -0.085 | -0.170 | -0.255 | -0.340 |
| Js | 0.337 | + | 11.0 | 10.1 | 9.0 | 8.0 | 7.0 | 6.2 | 5.5 | 5.2 | 5.1 |
|  |  | − | -10.2 | -9.2 | -8.2 | -7.2 | -6.4 | -5.6 | -5.1 | -4.8 | -4.7 |
|  | 0.253 | + | 9.8 | 8.8 | 7.8 | 6.7 | 5.7 | 4.8 | 4.2 | 3.8 | 3.7 |
|  |  | − | -8.7 | -7.8 | -6.7 | -5.8 | -4.9 | -4.2 | -3.7 | -3.4 | -3.3 |
|  | 0.169 | + | 8.1 | 7.1 | 6.0 | 4.9 | 3.9 | 3.0 | 2.4 | 2.0 | 1.9 |
|  |  | − | -7.0 | -6.0 | -5.0 | -4.1 | -3.2 | -2.5 | -2.0 | -1.7 | -1.6 |
|  | 0.085 | + | 6.1 | 5.1 | 4.0 | 2.9 | 1.9 | 1.0 | 0.3 | -0.1 | -0.2 |
|  |  | − | -5.2 | -4.2 | -3.2 | -2.3 | -1.5 | -0.8 | -0.3 | -0.0 | 0.1 |
|  | 0.000 | + | 4.3 | 3.3 | 2.2 | 1.1 | 0.0 | -0.9 | -1.6 | -2.0 | -2.1 |
|  |  | − | -3.6 | -2.7 | -1.7 | -0.8 | 0.0 | 0.7 | 1.2 | 1.5 | 1.6 |
|  | -0.085 | + | 3.1 | 2.1 | 1.0 | -0.2 | -1.2 | -2.1 | -2.8 | -3.3 | -3.4 |
|  |  | − | -2.7 | -1.7 | -0.8 | 0.1 | 0.9 | 1.6 | 2.1 | 2.4 | 2.5 |
|  | -0.170 | + | 2.6 | 1.6 | 0.7 | -0.5 | -1.6 | -2.5 | -3.2 | -3.6 | -3.7 |
|  |  | − | -2.4 | -1.5 | -0.6 | 0.3 | 1.1 | 1.8 | 2.3 | 2.6 | 2.7 |
|  | -0.254 | + | 3.5 | 2.5 | 1.4 | 0.2 | -0.8 | -1.8 | -2.4 | -2.8 | -2.9 |
|  |  | − | -3.0 | -2.0 | -1.1 | -0.2 | 0.6 | 1.3 | 1.8 | 2.1 | 2.2 |
|  | -0.339 | + |  |  |  |  |  |  |  |  |  |
|  |  | − |  |  |  |  |  |  |  |  |  |

LIGHT SOURCE DEVICE, OPTICAL SCANNING DEVICE, AND IMAGE FORMING APPARATUS

CROSS-REFERENCE TO RELATED APPLICATIONS

The present application claims priority to and incorporates by reference the entire contents of Japanese Patent Application No. 2010-034357 filed in Japan on Feb. 19, 2010.

BACKGROUND OF THE INVENTION

1. Field of the Invention

The present invention relates to a light source device, an optical scanning device, and an image forming apparatus. More specifically, the present invention relates to a light source device that emits laser light, an optical scanning device that includes the light source device, and an image forming apparatus that includes the optical scanning device.

2. Description of the Related Art

Image forming apparatuses employing a laser as a light source are widely used for electrophotographic image recording. Such image forming apparatuses include an optical scanning device that scans the surface of a photosensitive element with a light beam (scanning light beam) output from the light source and deflected by a deflector to form latent images on the surface of the photosensitive element. In image forming apparatuses, the light amount of a scanning light beam is changed with temperature variation or over time, which may cause inconsistencies in density of final output images (output images).

A conventional optical scanning device employing an edge-emitting laser monitors light backwardly output from the edge-emitting laser and performs auto power control (APC) for suppressing light output fluctuation. However, a surface-emitting laser does not backwardly emit light because of its structure, and therefore, an optical scanning device employing a surface-emitting laser requires light amount control different from the conventional APC. A method for performing APC based on the output of a light detector that is obtained by branching a part of a light beam output from a surface-emitting laser using an optical element such as a beam splitter and a half mirror and guiding it to the light detector has been devised as a light amount control method using a surface-emitting laser.

For example, Japanese Patent Application Laid-open No. 2002-040350 discloses an optical scanning device in which while a deflector deflects a laser beam output from a surface-emitting laser and collimated by a collimator lens to subject a surface to be scanned to scanning exposure, a beam splitting unit reflects a part of the laser beam to make a photoreceptor detect a light amount. The optical scanning device includes an aperture that collimates the laser beam at a position between the beam splitting unit and the collimator lens.

Japanese Patent Application Laid-open No. 2007-079295 discloses a multi-beam light source apparatus that includes: a light source unit with a plurality of luminous sources monolithically arranged in a direction of main scanning; a coupling lens for converting a plurality of optical beams output from the light source unit into a predetermined convergence state; and a supporting member for supporting the light source unit and the coupling lens in one body. In the multi-beam light source apparatus, the supporting member includes: a first member that supports the coupling lens and is installed such that a rotational adjustment is possible for centering an optical axis of the optical beams output from the light source unit; and a second member that supports the light source unit and is installed so that an inclination of the first member in a main scanning plane can be adjusted.

Japanese Patent Application Laid-open No. 2009-065064 discloses a monitoring device that includes: an optical element having a first aperture arranged such that a first portion of the light beam output from a light source and having maximum intensity passes through a substantial center of the first aperture, and a reflecting portion arranged around the first aperture such that the reflecting portion reflects a second portion of the light beam as a monitoring light beam; an aperture member having a second aperture that shapes a beam diameter of the monitoring light beam reflected by the optical element; and a light-receiving element that receives the monitoring light beam coming through the second aperture.

However, the optical scanning device disclosed in Japanese Patent Application Laid-open No. 2002-040350 and the monitoring device disclosed in Japanese Patent Application Laid-open No. 2009-065064 have disadvantages such that the optical path length from the light source to the light detector becomes long to disturb downsizing of the devices.

Moreover, the multi-beam luminous source apparatus disclosed in Japanese Patent Application Laid-open No. 2007-079295 has disadvantages such that the apparatus is significantly affected by the fluctuation of the divergence angle.

SUMMARY OF THE INVENTION

It is an object of the present invention to at least partially solve the problems in the conventional technology.

According to an aspect of the present invention, there is provided a light source device including: a light source; a splitting element that is arranged on an optical path of a light beam output from the light source and splits the light beam into a first light beam and a second light beam; a first opening plate that is arranged on an optical path of the first light beam split by the splitting element, has a first opening portion, and shapes the first light beam; and a second opening plate that is arranged on an optical path of the second light beam split by the splitting element, has a second opening portion having a shape different from a shape of the first opening portion, and shapes the second light beam, wherein states of light beams entering the first opening plate and the second opening plate are different from each other, and relationships $|(\theta 11-\theta 12)/\theta 1|\leq 0.085$ and $|(\theta 21-\theta 22)/\theta 2|\leq 0.085$ are satisfied where: in relation to a first direction and a second direction that are orthogonal to each other in a plane orthogonal to a traveling direction of a light beam output from the light source, $\theta 1$ denotes a divergence angle of the light beam in the first direction, $\theta 2$ denotes a divergence angle of the light beam in the second direction, $\theta 11$ denotes an emission angle at the light source in the first direction of a light beam passing through the first opening portion, $\theta 21$ denotes an emission angle at the light source in the second direction of the light beam passing through the first opening portion, $\theta 12$ denotes an emission angle at the light source in the first direction of a light beam passing through the second opening portion, and $\theta 22$ denotes an emission angle at the light source in the second direction of the light beam passing through the second opening portion.

According to another aspect of the present invention, there is provided an optical scanning device that scans a surface to be scanned with a light beam in a main-scanning direction, the optical scanning device including: the light source device described above; a deflector that deflects the light beam output from the light source device; and a scanning optical system that condenses the light beam deflected by the deflector on the surface to be scanned.

According to still another aspect of the present invention, there is provided an image forming apparatus including: at least one image carrier; and at least one optical scanning device described above that scans the at least one image carrier using a light beam modulated according to image information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6A is a schematic diagram explaining the shape of an opening portion of a first opening plate, and FIG. 6B is a schematic diagram explaining the shape of an opening portion of the second opening plate;

FIG. 11 is a graph explaining spatial light intensity distributions of a light beam after passing through an opening portion A and a light beam after passing through an opening portion B;

FIG. 12A is a schematic diagram explaining θm1, and FIG. 12B is a schematic diagram explaining θs1;

FIG. 14A is a table explaining an example 1, FIG. 14B is a table explaining an example 2, FIG. 14C is a table explaining an example 3, and FIG. 14D is a table explaining an example 4;

FIG. 15 is a table explaining the calculation result of the example 1;

FIG. 16 is a table explaining the calculation result of the example 2;

FIG. 17 is a table explaining the calculation result of the example 3;

FIG. 18 is a table explaining the calculation result of the example 4;

DETAILED DESCRIPTION OF THE PREFERRED EMBODIMENTS

Figure 1:
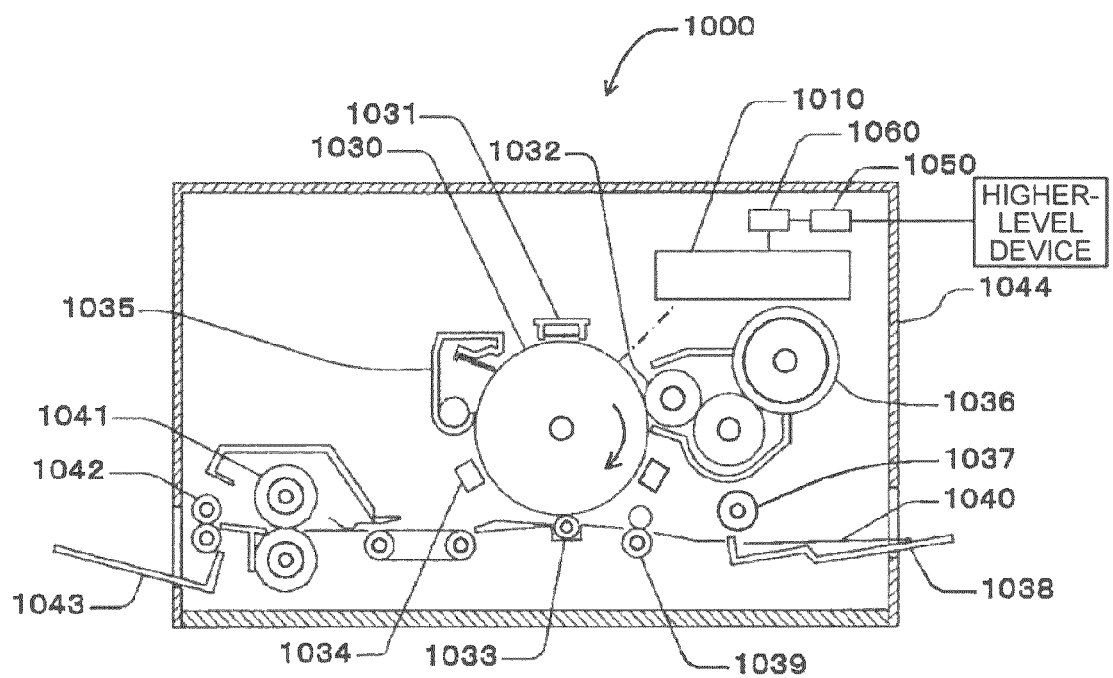
FIG. 1 is a schematic diagram of a laser printer according to an embodiment of the present invention.

Preferred embodiments of the present invention are described below with reference to FIGS. 1 to 19. FIG. 1 is a schematic diagram of a laser printer 1000 as an image forming apparatus according to an embodiment of the present invention.

The laser printer 1000 includes an optical scanning device 1010, a photosensitive drum 1030, an electric charger 1031, a developing roller 1032, a transfer charger 1033, a neutralization unit 1034, a cleaning unit 1035, a toner cartridge 1036, a feeding roller 1037, a paper feed tray 1038, a pair of registration rollers 1039, a fixing roller 1041, a discharging roller 1042, a discharge tray 1043, a communication control device 1050, and a printer control device 1060 that collectively controls each of the units described above. These are housed in a printer housing 1044 at predetermined positions.

The communication control device 1050 controls two-way communication between the laser printer 1000 and a higher-level device (a personal computer, for example) via a network or the like.

The photosensitive drum 1030 is a cylindrical member and has a photosensitive layer formed on the surface thereof. In other words, the surface of the photosensitive drum 1030 is a surface to be scanned. The photosensitive drum 1030 rotates in an arrow direction illustrated in FIG. 1.

The electric charger 1031, the developing roller 1032, the transfer charger 1033, the neutralization unit 1034, and the cleaning unit 1035 are arranged near the surface of the photosensitive drum 1030. The electric charger 1031, the developing roller 1032, the transfer charger 1033, the neutralization unit 1034, and the cleaning unit 1035 are arranged in this order along the rotation direction of the photosensitive drum 1030.

The electric charger 1031 uniformly charges the surface of the photosensitive drum 1030.

The optical scanning device 1010 irradiates the surface of the photosensitive drum 1030 charged by the electric charger 1031 with a light beam modulated based on image information received from the higher-level device. As a result, a latent image corresponding to the image information is formed on the surface of the photosensitive drum 1030. The latent image formed in this process moves in a direction of the developing roller 1032 according to the rotation of the photosensitive drum 1030. The structure of the optical scanning device 1010 is described later.

Toner is stored in the toner cartridge 1036 and is supplied to the developing roller 1032.

The developing roller 1032 makes the toner supplied from the toner cartridge 1036 adhere to the latent image formed on the surface of the photosensitive drum 1030 to visualize the image information. The latent image to which the toner is adhered (hereinafter, also referred to as a "toner image" for convenience) moves in a direction of the transfer charger 1033 according to the rotation of the photosensitive drum 1030.

The paper feed tray 1038 stores therein a recording sheet 1040. The feeding roller 1037 is arranged near the paper feed tray 1038, takes out the recording sheet 1040 from the paper feed tray 1038 one by one, and conveys the sheet to the pair of registration rollers 1039. The pair of registration rollers 1039 once holds the recording sheet 1040 taken out by the feeding roller 1037 and sends out the recording sheet 1040 into the gap between the photosensitive drum 1030 and the transfer charger 1033 according to the rotation of the photosensitive drum 1030.

Voltage having a polarity opposite to that of the toner is applied to the transfer charger 1033 in order to electrically attract the toner on the surface of the photosensitive drum 1030 to the recording sheet 1040. The toner image on the surface of the photosensitive drum 1030 is transferred onto the recording sheet 1040 with this voltage. The recording sheet 1040 transferred in this process is sent to the fixing roller 1041.

The fixing roller 1041 applies heat and pressure onto the recording sheet 1040, and thus, the toner is fixed on the recording sheet 1040. The recording sheet 1040 fixed in this process is sent to the discharge tray 1043 via the discharging roller 1042 and is sequentially stacked on the discharge tray 1043.

The neutralization unit 1034 neutralizes the surface of the photosensitive drum 1030.

The cleaning unit 1035 removes the toner (residual toner) remaining on the surface of the photosensitive drum 1030. The surface of the photosensitive drum 1030 from which the residual toner is removed returns to a position facing the electric charger 1031 again.

The structure of the optical scanning device 1010 is described below.

Figure 2:
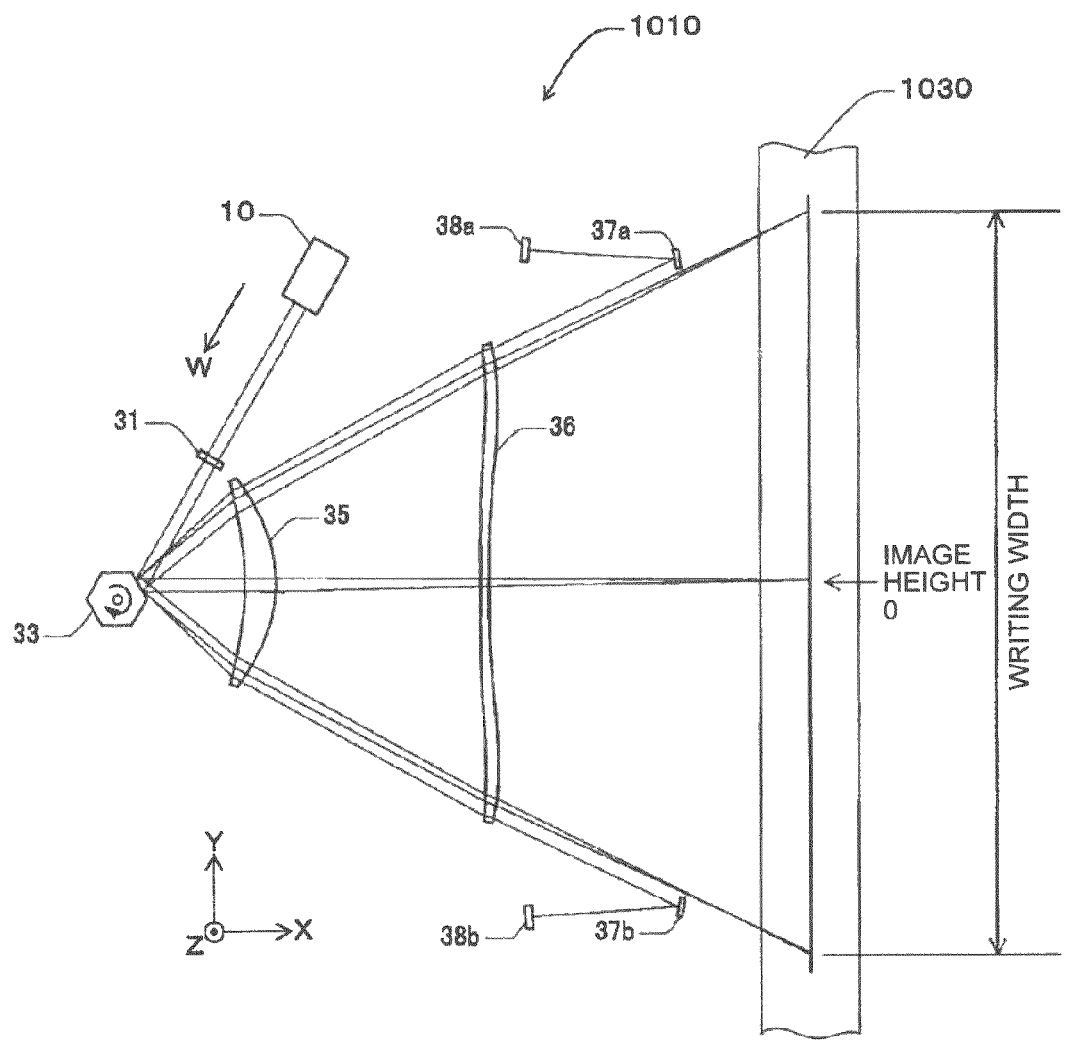
FIG. 2 is a schematic diagram of an optical scanning device illustrated in FIG. 1.

As illustrated in FIG. 2 as one example, the optical scanning device 1010 includes a light source device 10, a gcylindrical lens 31, a polygon mirror 33, a deflector side-scanning lens 35, an image surface side-scanning lens 36, two light detection mirrors (37a and 37b), and two light detection sensors (38a and 38b).

The present specification describes, in an XYZ-three dimensional rectangular coordinate system, a direction along the longitudinal direction of the photosensitive drum 1030 as a Y-axis direction and a direction along the optical axis of each of the scanning lenses 35 and 36 as an X-axis direction. The traveling direction of the light beam directing to the polygon mirror 33 from the light source device 10 is described as a "W direction" hereinafter for convenience.

The direction corresponding to the main-scanning direction is abbreviated as a "main-scanning corresponding direction", and the direction corresponding to the sub-scanning direction is abbreviated as a "sub-scanning corresponding direction" hereinafter for convenience.

Figure 3:
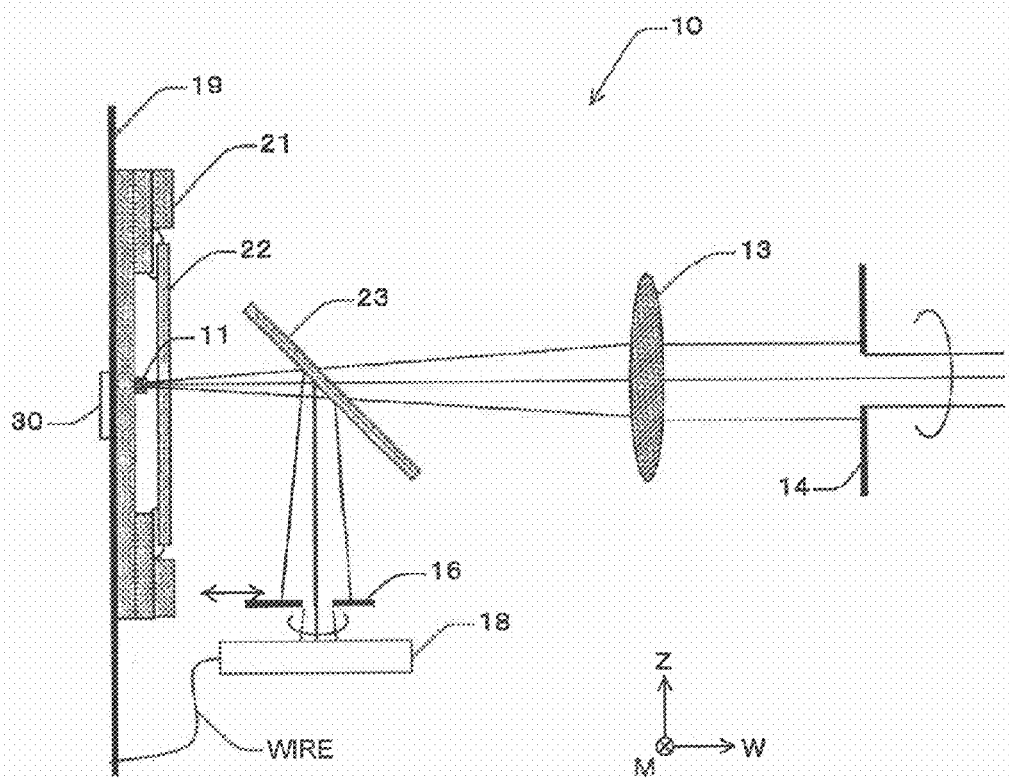
FIG. 3 is a schematic diagram of a light source device illustrated in FIG. 2.

As illustrated in FIG. 3 as one example, the light source device 10 includes a light source 11, a coupling lens 13, a first opening plate 14, a second opening plate 16, a photoreceptor 18, a package member 21, a cover glass 22, a half mirror 23, and a light source control device 30. The package member 21 and the light source control device 30 are mounted on a single circuit board 19. An "M direction" illustrated in FIG. 3 is a main-scanning corresponding direction at the light source 11.

In FIG. 3, the package member 21 and the light source control device 30 are mounted on the surfaces of the circuit board 19 in the +W direction and the −W direction, respectively.

The package member 21 is a flat package called a ceramic leaded chip carrier (CLCC) and has, on the +W side, a spacial area whose periphery is surrounded by a wall. The light source 11 is held at the central bottom of the spacial area.

Figure 4:
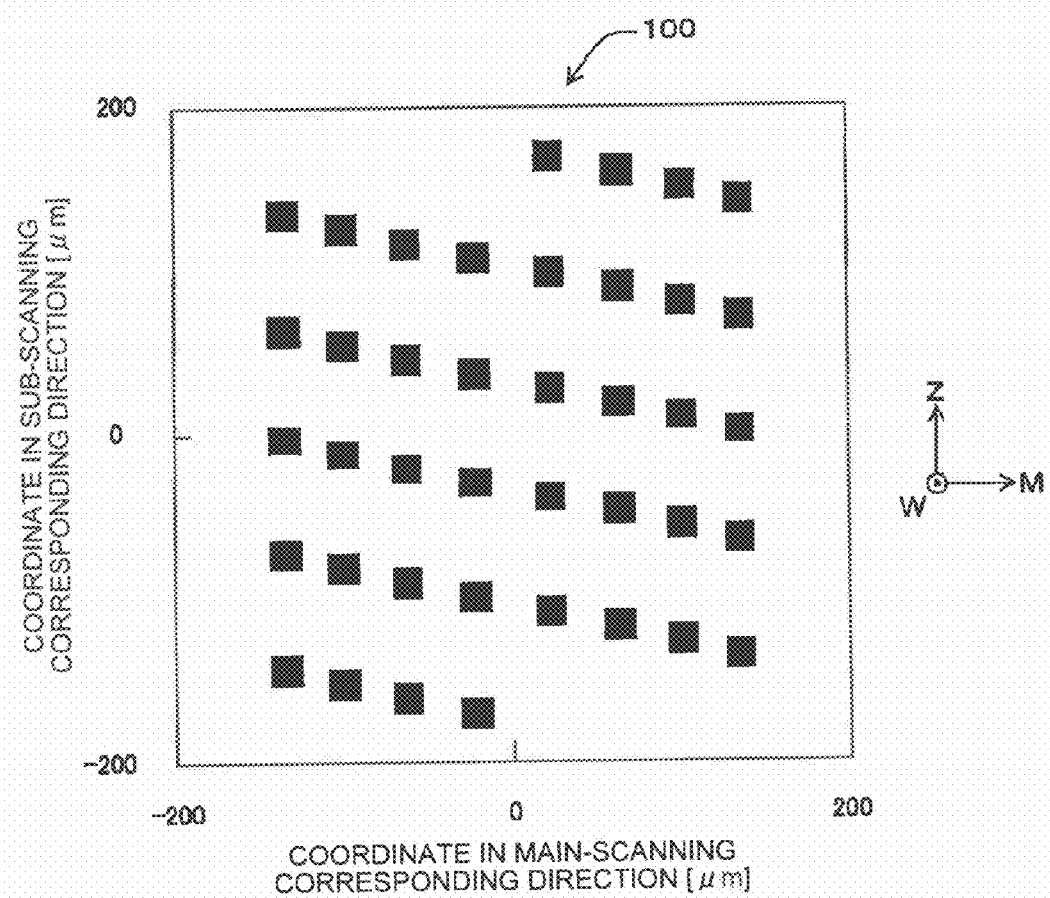
FIG. 4 is a schematic diagram of a two-dimensional array light-emitting device included in a light source illustrated in FIG. 3.

As illustrated in FIG. 4 as one example, the light source 11 includes a two-dimensional array light-emitting device 100 that is formed on a single board and in which forty light-emitting elements are two-dimensionally arrayed. These forty light-emitting elements are arrayed so as to be spaced uniformly when all of the light-emitting elements are orthographically projected on virtual lines extending in a sub-scanning corresponding direction (direction same as a Z-axis direction in this case). In the present specification, a "light-emitting element interval" means a distance between the centers of two light-emitting elements.

Each of the light-emitting elements is a vertical cavity surface-emitting laser (VCSEL) having an oscillation wavelength of a 780-nanometer band. In other words, the two-dimensional array light-emitting device 100 is a surface-emitting laser array including forty light-emitting elements.

The light source 11 is arranged such that the light beam is output in a +W direction.

Referring back to FIG. 3, the cover glass 22 is a plate-like member and is arranged on a surface at the +W side of the package member 21 so as to seal the space region. In other words, the cover glass 22 prevents the adhesion of dusts and dirt on the light source 11.

The half mirror 23 is arranged on the optical path of a light beam output from the light source 11, and splits the light beam into transmitted light and reflected light. A ratio of transmitted light to reflected light is not limited to a specific value, but determined by an output of the light source 11, an optical system structure, the optical sensitivity of the photosensitive element 1030, and the optical sensitivity of the photoreceptor 18, for example.

The half mirror 23 is a plate-like member whose one surface is parallel to the other surface. In this case, the half mirror 23 is installed in a holder (not illustrated) in such a manner that a surface of the half mirror 23 is inclined with respect to the MZ plane at 45 degrees. Because of the posture, the half mirror 23 reflects part of the light beam output from the light source in the −Z direction. The light beam reflected by the half mirror 23 is also called a "monitoring light beam" hereinafter for the sake of convenience, and the light beam after passing through the half mirror 23 is also called a "writing light beam".

The coupling lens 13 is arranged on the optical path of the writing light beam. The writing light beam becomes a substantially parallel light by passing through the coupling lens 13. The coupling lens 13 is rotationally symmetric in the MZ plane and has equal optical power in both the M direction and the Z-axis direction.

The first opening plate 14 has an opening portion and is arranged on the optical path of a light beam via the coupling lens 13 to shape the light beam. In the first opening plate 14, the M direction is the main-scanning corresponding direction, while the Z-axis direction is the sub-scanning corresponding direction. A light beam after passing through the opening portion of the first opening plate 14 is the light beam output from the light source device 10.

The second opening plate 16 is a plate-like member with an opening portion and is arranged on the optical path of a monitoring light beam to shape the monitoring light beam. In the second opening plate 16, the M direction is the main-scanning corresponding direction, while the W direction is the sub-scanning corresponding direction.

The light beams entering the first opening plate 14 and the second opening plate 16 have different states (e.g., a beam diameter and a peak intensity) with each other.

Figure 5:
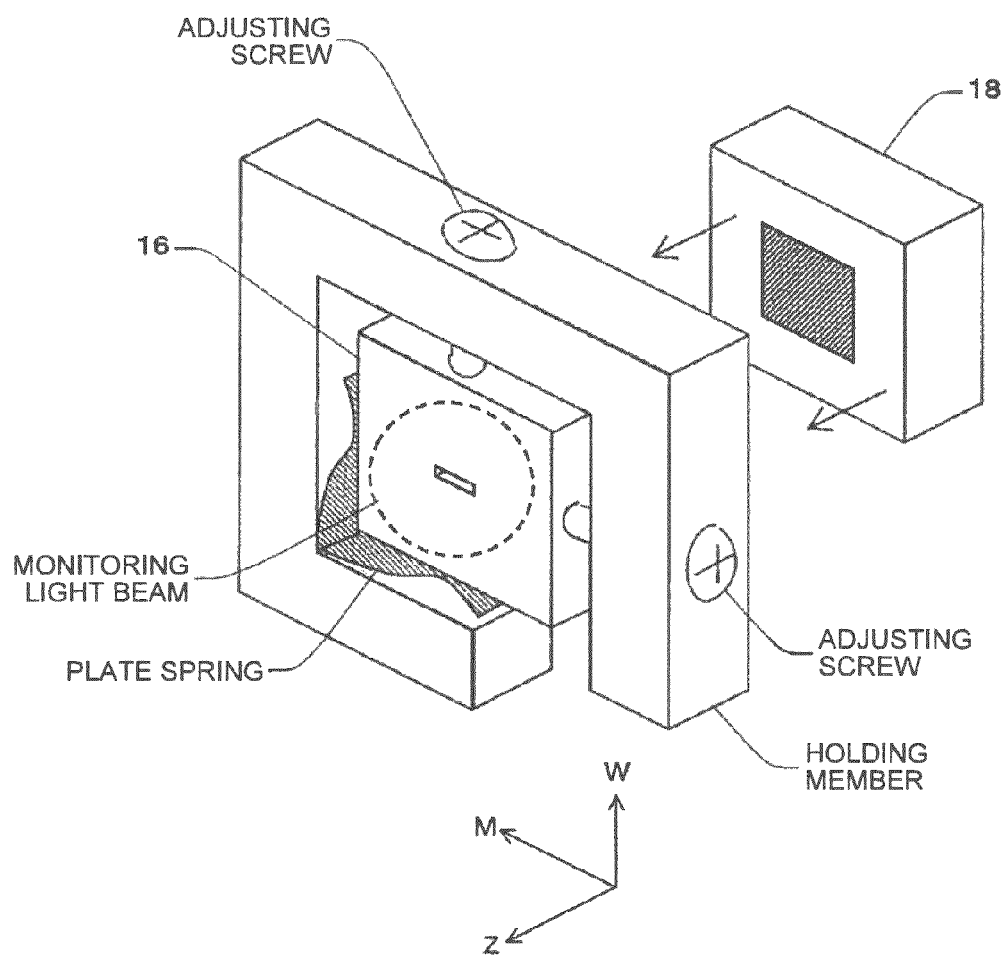
FIG. 5 is a schematic diagram of a positioning mechanism for positioning a second opening plate illustrated in FIG. 3.

As illustrated in FIG. 5 as one example, the second opening plate 16 is fixed at an appropriate position with the positioning mechanism for positioning in the MW surface.

The positioning mechanism includes: a frame like holding member that surrounds the periphery of the second opening plate 16; a plate spring that is inserted between the second opening plate 16 and the inner wall of the holding member and that applies pressing force to the second opening plate 16 in the −M direction and the +W direction; and two adjusting screws that are installed in the holding member so as to be opposed to the plate spring and that make the second opening plate 16 move in the M direction and the W direction. The position of the second opening plate 16 is adjusted depending on the inserted amount of the two adjusting screws.

In this embodiment, the second opening plate 16 is adjusted to a position where the light amount received by the photoreceptor 18 reaches the maximum. In the position, the peak position of the light intensity of the light beam passing through the opening portion of the second opening plate 16 substantially corresponds to the center of the opening portion of the second opening plate 16.

Referring back to FIG. 3, the photoreceptor 18 receives the light beam passing through the opening portion of the second opening plate 16. The photoreceptor 18 outputs an electrical signal corresponding to the amount of received light. The electrical signal is sent to the circuit board 19 via a wire and is supplied to the light source control device 30.

An optical system arranged on the optical path of a light beam between the half mirror 23 and the photoreceptor 18 is also called as a monitoring optical system. In the embodiment, the monitoring optical system is composed of the second opening plate 16 alone.

The opening portions of the first opening plate 14 and the second opening plate 16 are described below. The opening portion of the first opening plate 14 is called an "opening portion A", while the opening portion of the second opening plate 16 is called an "opening portion B" hereinafter for the sake of convenience.

Both the opening portions A and B have a rectangular shape as illustrated in FIGS. 6A and 6B, and the shapes are similar to each other. The opening portion of the second opening plate 16 is proportionally shrunk relative to the opening portion of the first opening plate 14 because the optical path length from the light source 11 to the second opening plate 16 is shorter than the optical path length from the light source 11 to the first opening plate 14, and also because of the optical system arrangement.

A direction corresponding to the Z-axis direction in the first opening plate 14 is the W direction in the second opening plate 16. Here, Dm1 denotes the length of the opening portion A in the main-scanning corresponding direction (M direction), Ds1 denotes the length of the opening portion A in the sub-scanning corresponding direction (Z-axis direction), Dm2 denotes the length of the opening portion B in the main-scanning corresponding direction (M direction), and Ds2 denotes the length of the opening portion B in the sub-scanning corresponding direction (W direction).

Figure 7A:
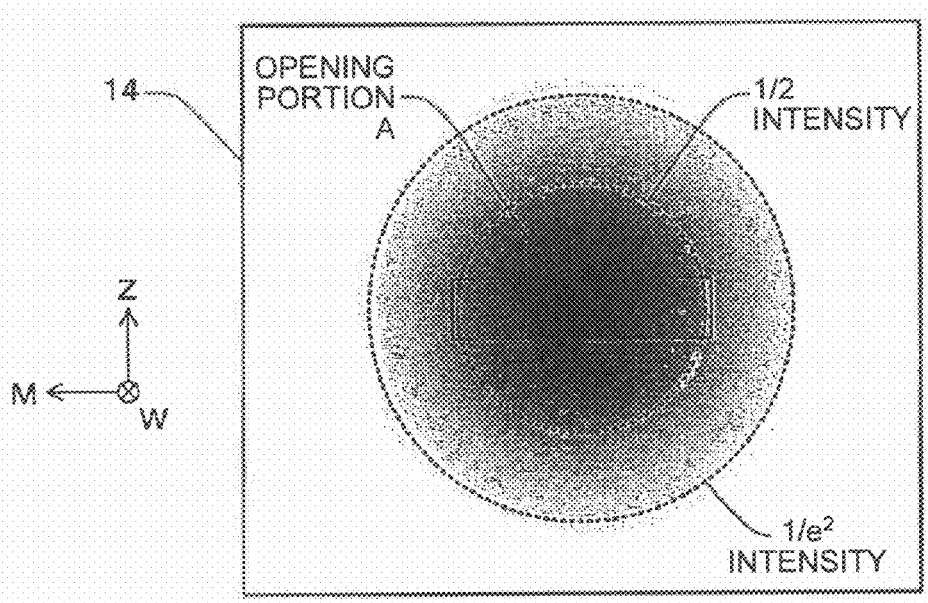
FIGS. 7A and 7B are schematic diagrams explaining a relationship between the opening portion of the first opening plate and a writing light beam.
Figure 7B:
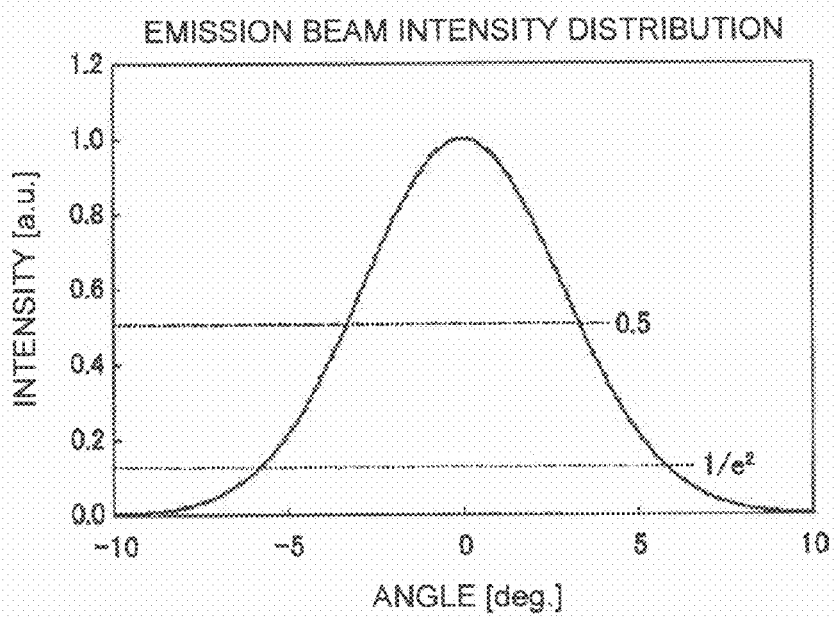
Figure 8:
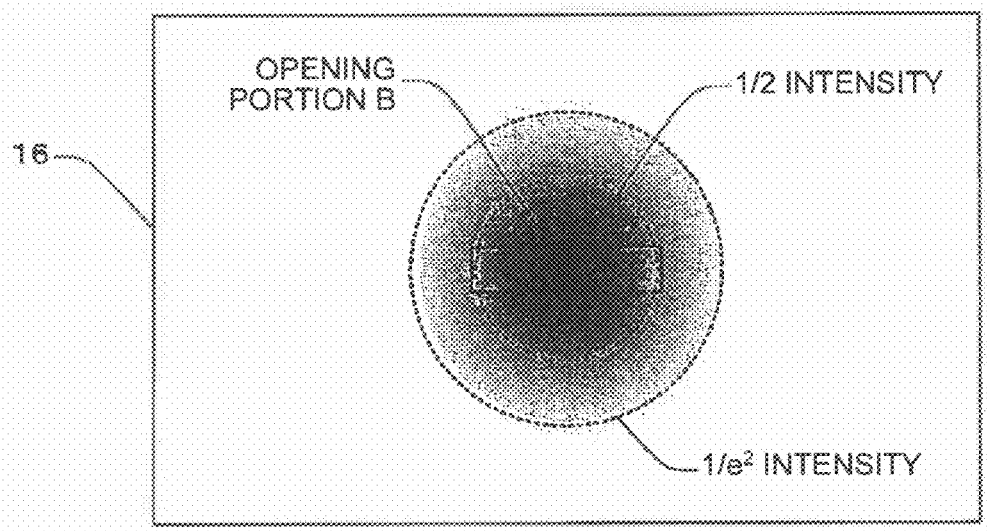
FIG. 8 is a schematic diagram explaining a relationship between the opening portion of the second opening plate and a monitoring light beam.

The opening portion A is set, as illustrated in FIGS. 7A and 7B as one example, in such a manner that the light intensity of a light beam passing through the vicinity of both ends thereof in the main-scanning corresponding direction is half of a peak value. On the other hand, the opening portion B is set, as illustrated in FIG. 8 as one example, in such a manner that the light intensity of a light beam passing through the vicinity of both ends thereof in the main-scanning corresponding direction is half of a peak value.

In the embodiment, a divergence angle ($\theta$m) of a light beam output from the light source 11 in the main-scanning corresponding direction (M direction) is seven degrees while a divergence angle ($\theta$s) of that in the sub-scanning corresponding direction (Z-axis direction) is also seven degrees. These divergence angles are defined as the full width at half maximum (FWHM) values. The focal length (fcol) of the coupling lens 13 is 45 mm.

Figure 9:
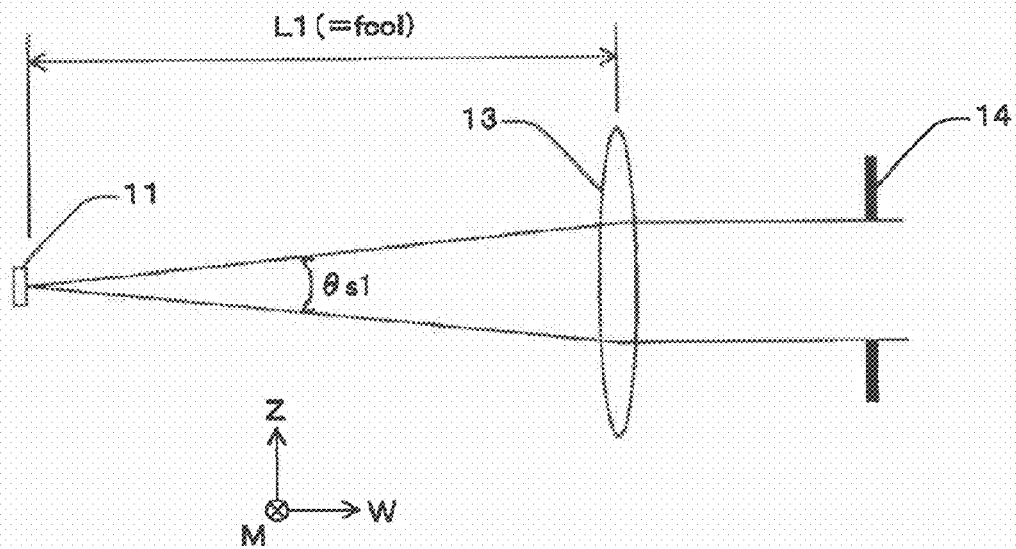
FIG. 9 is a schematic diagram explaining L1.
Figure 10:
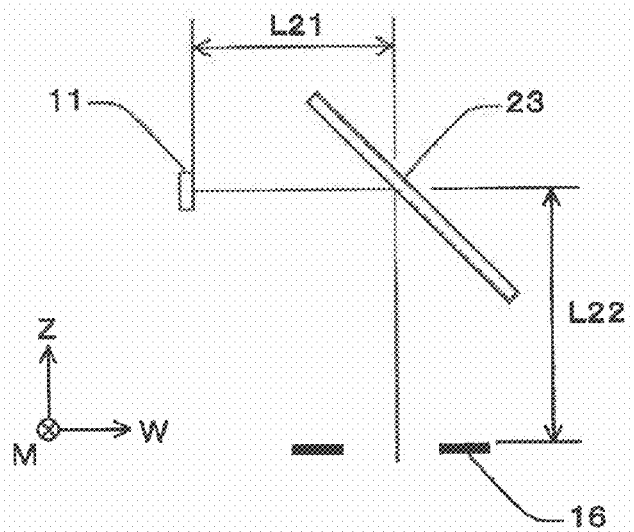
FIG. 10 is a schematic diagram explaining L2.

As for the dimensions, Dm1 is 5.6 mm, Ds1 is 1.18 mm, Dm2 is 4.33 (=5.6/L1×L2) mm, and Ds2 is 0.91 (=1.18/L1×L2) mm. L1 is the distance (the same as fcol herein) from the light source 11 to the coupling lens 13 as illustrated in FIG. 9. L2 is the optical path length (34.78 mm herein) from the light source 11 to the second opening plate 16 as illustrated in FIG. 10.

FIG. 11 illustrates a spatial light intensity distribution (referred to as a spatial light intensity distribution A) of a light beam after passing through the opening portion A and a spatial light intensity distribution (referred to as a spatial light intensity distribution B) of a light beam after passing through the opening portion B. The horizontal axis represents the positional coordinate in the main-scanning corresponding direction with the peak position of the light intensity at zero, while the vertical axis represents the light intensity normalized with the peak value.

The light intensities at both ends of the spatial light intensity distribution A are the same (P1). Likewise, the light intensities at both ends of the spatial light intensity distribution B are the same (P3). In addition, P1=P3.

Furthermore, in both the spatial light intensity distributions A and B, when the horizontal axis represents the positional coordinate in the sub-scanning corresponding direction with the peak position of the light intensity at zero, the light intensities at both ends of the spatial light intensity distribution A are the same (P2), and also the light intensities at both ends of the spatial light intensity distribution B are the same (P4). In addition, P2=P4.

In other words, the respective shapes of the opening portions A and B are set so as to satisfy the relationships P1≈P3 and P2≈P4 (hereinafter, also referred to as a "light intensity equivalence relation" for the sake of convenience).

The writing light beam and the monitoring light beam differently diverge because the light beams travel in different optical systems on the optical paths and have different optical path lengths from each other. However, the normalized light intensities at both ends of the two light beams passing through the respective opening portions are the same. This condition is maintained both in the main-scanning corresponding direction and the sub-scanning corresponding direction. Accordingly, this maintained condition enables the writing light beam and the monitoring light beam to equally receive the effect of a divergence angle fluctuation of the light beam output from the two-dimensional array light-emitting device 100.

Figure 13A:
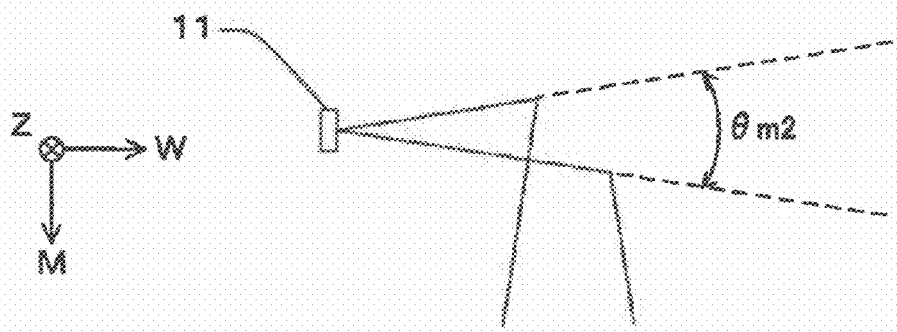
FIGS. 13A and 13B are schematic diagrams explaining θm2.
Figure 13B:
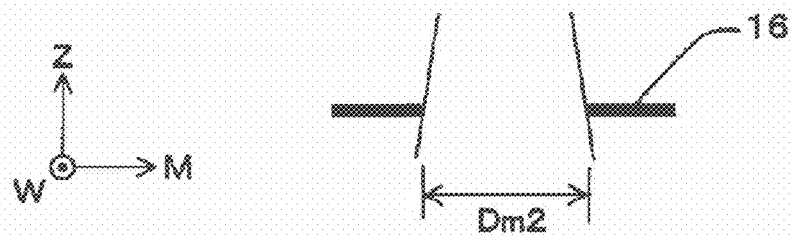
Figure 13C:
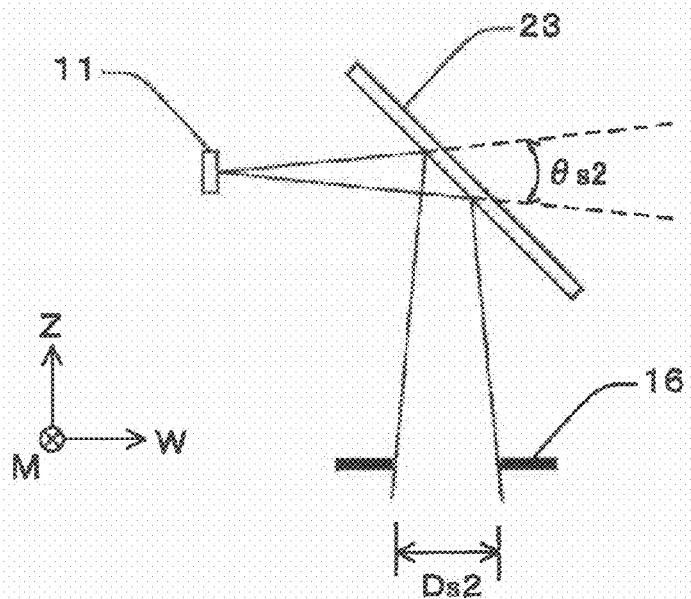
FIG. 13C is a schematic diagram explaining θs2.

$\theta$m1 denotes an emission angle, at the light source 11, of a light beam passing through the opening portion A in the main-scanning corresponding direction as illustrated in FIG. 12A, while θs1 denotes an emission angle, at the light source 11, of the light beam passing through the opening portion A in the sub-scanning corresponding direction as illustrated in FIG. 12B.

θm2 denotes an emission angle, at the light source 11, of a light beam passing through the opening portion B in the main-scanning corresponding direction as illustrated in FIGS. 13A and 13B, while θs2 denotes an emission angle, at the light source 11, of the light beam passing through the opening portion B in the sub-scanning corresponding direction as illustrated in FIG. 13C.

In this regard, θm1, θs1, θm2, and θs2 are each defined as an angle made by light beams passing through both ends of the respective opening portions at the time when they are output from the light source. Because of the definition, they differ from the divergence angles (θm and θs) each represented with the full width at half maximum value.

θm1 can be calculated with formula (1).

$$\theta m1 = 2 \times \tan^{-1}(Dm1/2 \times \text{fcol}) \quad (1)$$

θs1 can be calculated with formula (2).

$$\theta s1 = 2 \times \tan^{-1}(Ds1/2 \times \text{fcol}) \quad (2)$$

θm2 can be calculated with formula (3).

$$\theta m2 = 2 \times \tan^{-1}(Dm2/2 \times L2) \quad (3)$$

θs2 can be calculated with formula (4).

$$\theta s2 = 2 \times \tan^{-1}(Ds2/2 \times L2) \quad (4)$$

Here, θm1=θm2=7.12 degrees and θs1=θs2=1.50 degrees.

In other words, in each of the main-scanning corresponding direction and the sub-scanning corresponding direction, the emission angle at the light source 11 of a light beam passing through the opening portion A and the emission angle at the light source 11 of a light beam passing through the opening portion B are equal.

Because of the relationship, the light amount ratio of a writing light beam to a monitoring light beam is constant even if the divergence angle of a light beam varies at the light source.

Generally, the divergence angle at the light source may vary about 10%.

Supposing that the divergence angle of a light beam output from the light source 11 is A, η1a denotes the value obtained by dividing a light amount of a light beam after passing through the opening portion A by a light amount of a light beam entering the first opening plate 14, while η2a denotes the value obtained by dividing a light amount of a light beam after passing through the opening portion B by a light amount of a light beam entering the second opening plate 16.

When the divergence angle A of the light beam output from the light source 11 changes by 10% to become B, η1b denotes the value obtained by dividing a light amount of a light beam after passing through the opening portion A by a light amount of a light beam entering the first opening plate 14, while η2b denotes the value obtained by dividing a light amount of a light beam after passing through the opening portion B by a light amount of a light beam entering the second opening plate 16.

The value obtained by dividing a light amount of a light beam after passing through the opening portion of the opening plate by a light amount of a light beam entering this opening plate is also referred to as a "light use efficiency of the opening plate", below.

The absolute value of Δ represented with formula (5) is three (%) or smaller.

$$\Delta = \{1 - (\eta 2b/\eta 1b)/(\eta 2a/\eta 1a)\} \times 100 \quad (5)$$

If the absolute value of Δ is more than three (%), generally a density difference exceeds 3% in output images and the difference is perceived as density unevenness.

Here, Jm is defined with formula (6) while Js is defined with formula (7).

$$Jm = (\theta m1 - \theta m2)/\theta m \quad (6)$$

$$Js = (\theta s1 - \theta s2)/\theta s \quad (7)$$

The relationships among Δ, Jm, and Js were calculated for four examples including the embodiment. The calculation was carried out with the conditions that the divergence angle from the light source changes by +10% and −10% in both the main-scanning corresponding direction and the sub-scanning corresponding direction.

In these examples, the opening portions have a rectangular shape, a light beam passing through the half mirror 23 is rendered parallel by the coupling lens 13, and thereafter enters the first opening plate 14, while a light beam reflected by the half mirror 23 diverges and enters the second opening plate 16.

A calculation method used herein is simply described below. In the description of the method, the main-scanning corresponding direction is defined as a y direction while the sub-scanning corresponding direction is defined as a z direction for the sake of convenience.

The spatial light intensity distribution of a light beam output from a semiconductor laser can be represented with a gaussian function (normal distribution). Accordingly, a light intensity distribution G (y, z) in a yz plane can be represented with formula (8):

$$G(y, z) = \frac{1}{\sqrt{2\pi}\,\sigma y} \exp\left(-\frac{(y-\mu y)^2}{2\sigma y^2}\right) \cdot \frac{1}{\sqrt{2\pi}\,\sigma z} \exp\left(-\frac{(z-\mu z)^2}{2\sigma z^2}\right) \quad (8)$$

where σy is the standard deviation (deg.) within a cross-section in the y direction, σz is the standard deviation (deg.) within a cross-section in the z direction, μy is the average value (deg.) within the cross-section in the y direction and corresponds to an emission direction deviation in the y direction, and μz is the average value (deg.) within the cross-section in the z direction and corresponds to an emission direction shift in the z direction.

The integration of G (y, z) in all ranges is represented with formula (9).

$$\int_{-\infty}^{\infty}\int_{-\infty}^{\infty} \frac{1}{2\pi\sigma y \cdot \sigma z} \exp\left(-\frac{1}{2}\left(\left(\frac{y-\mu y}{\sigma y}\right)^2 + \left(\frac{z-\mu z}{\sigma z}\right)^2\right)\right) dy\,dz = 1 \quad (9)$$

σy is represented with formula (10) and σz is represented with formula (11). Here, μy=0 and μz=0.

$$\sigma y = \frac{\theta by}{2\sqrt{2\ln 2}} \quad (10)$$

where θby is the divergence angle in the main-scanning corresponding direction.

$$\sigma z = \frac{\theta bz}{2\sqrt{2\ln 2}} \quad (11)$$

where $\theta bz$ is the divergence angle in the sub-scanning corresponding direction.

Supposing that $\eta 1$ denotes the light use efficiency of the first opening plate and $\eta 2$ denotes the light use efficiency of the second opening plate, $\eta 1$ is represented with formula (12) while $\eta 2$ is represented with formula (13).

$$\eta_1 = \int_{-\theta a 1 y/2}^{\theta a 1 y/2} \int_{-\theta a 1 z/2}^{\theta a 1 z/2} \frac{1}{2\pi \sigma y \cdot \sigma z} \exp\left(-\frac{1}{2}\right) \left( \frac{\left(\frac{y}{\sigma y}\right)^2 +}{\left(\frac{z}{\sigma z}\right)^2} \right) dy\, dz \quad (12)$$

where $\theta a 1 y$ is the emission angle in the main-scanning corresponding direction of a light beam passing the opening portion of the first opening plate, while $\theta a 1 z$ is the emission angle in the sub-scanning corresponding direction of a light beam passing the opening portion of the first opening plate.

$$\eta_2 = \int_{-\theta a 2 y/2}^{\theta a 2 y/2} \int_{-\theta a 2 z/2}^{\theta a 2 z/2} \frac{1}{2\pi \sigma y \cdot \sigma z} \exp\left(-\frac{1}{2}\right) \left( \frac{\left(\frac{y}{\sigma y}\right)^2 +}{\left(\frac{z}{\sigma z}\right)^2} \right) dy\, dz \quad (13)$$

where $\theta a 2 y$ is the emission angle in the main-scanning corresponding direction of a light beam passing the opening portion of the second opening plate, while $\theta a 2 z$ is the emission angle in the sub-scanning corresponding direction of a light beam passing the opening portion of the second opening plate. In other words, the integration ranges correspond to the shapes of the respective opening portions.

The case is considered that the divergence angles $\theta by$ and $\theta bz$ change +10% or −10% to become $\theta by'$ and $\theta bz'$. In this case, $\sigma y$ becomes $\sigma y'$ represented with formula (14) and $\sigma z$ becomes $\sigma z'$ represented with formula (15).

$$\sigma y' = \frac{\theta by'}{2\sqrt{2\ln 2}} \quad (14)$$

$$\sigma z' = \frac{\theta bz'}{2\sqrt{2\ln 2}} \quad (15)$$

In addition, $\eta 1$ becomes $\eta 1'$ represented with formula (16) and $\eta 2$ becomes $\eta 2'$ represented with formula (17).

$$\eta'_1 = \int_{-\theta a 1 y/2}^{\theta a 1 y/2} \int_{-\theta a 1 z/2}^{\theta a 1 z/2} \frac{1}{2\pi \sigma y' \cdot \sigma' z} \exp\left(-\frac{1}{2}\right) \left( \frac{\left(\frac{y}{\sigma y'}\right)^2 +}{\left(\frac{z}{\sigma z'}\right)^2} \right) dy\, dz \quad (16)$$

$$\eta'_2 = \int_{-\theta a 2 y/2}^{\theta a 2 y/2} \int_{-\theta a 2 z/2}^{\theta a 2 z/2} \frac{1}{2\pi \sigma y' \cdot \sigma z'} \exp\left(-\frac{1}{2}\right) \left( \frac{\left(\frac{y}{\sigma y'}\right)^2 +}{\left(\frac{z}{\sigma z'}\right)^2} \right) dy\, dz \quad (17)$$

As a result, $\Delta$ corresponding to formula (5) can be obtained with formula (18).

$$\Delta = \{1 - (\eta 2'/\eta 1')/(\eta 2/\eta 1)\} \times 100 \quad (18)$$

When a light beam is eccentric from the center of the opening portion, μy and μz may be given corresponding to the eccentric amounts in the above-described calculation.

The conditions of an example 1 are illustrated in FIG. 14A as follows: $\theta m$=7.00 (deg.), $\theta s$=7.00 (deg.), L1=45.00 (mm), Dm1=5.60 (mm), Ds1=1.18 (mm), $\theta m1$=7.12 (deg.), $\theta s1$=1.50 (deg.), and L2=34.78 (mm).

$\Delta$ was calculated by changing $\theta m2$ and $\theta s2$, and then the relationships among Jm, Js, and $\Delta$ were obtained. The results are listed in FIG. 15. For example, when Jm is 0.169 and Js is 0.085 and the divergence angle changes by +10%, $\Delta$ changes by 2.7%. The cases that the absolute value of $\Delta$ is three (%) or smaller are indicated with bold numbers. The columns with diagonals and no numbers indicate the cases that the emission angles are negative values.

The dimensions of the opening portion B that cause Jm and Js to fall in the range of −0.085 to +0.085 are as follows: Dm2 is from 3.61 to 5.05 (mm), and Ds2 is from 0.19 to 1.63 (mm).

When Jm=Js=0, $\theta m2$=7.12 (deg.), $\theta s2$=1.50 (deg.), Dm2=4.33 (mm), and Ds2=0.91 (mm).

In the example 1, a degree of freedom in dimensions of the opening portion B is larger in the sub-scanning corresponding direction than in the main-scanning corresponding direction. This is because the emission angle $\theta s1$ is smaller than the divergence angle $\theta s$. In such case, the light intensity distribution of a light beam passing through the opening portion A is mostly flat in the sub-scanning corresponding direction, so that the change of $\Delta$ with respect to the change of the divergence angle becomes small.

The conditions of an example 2 are illustrated in FIG. 14B as follows: $\theta m$=14.00 (deg.), $\theta s$=6.00 (deg.), L1=45.00 (mm), Dm1=5.00 (mm), Ds1=1.50 (mm), $\theta m1$=6.36 (deg.), $\theta s1$=1.91 (deg.), and L2=34.78 (mm).

$\Delta$ was calculated by changing $\theta m2$ and $\theta s2$, and then the relationships among Jm, Js, and $\Delta$ were obtained. The results are listed in FIG. 16.

The dimensions of the opening portion B that cause Jm and Js to fall in the range of −0.085 to +0.085 are as follows: Dm2 is from 3.52 to 6.42 (mm), and Ds2 is from 0.05 to 2.93 (mm).

When Jm=Js=0, $\theta m2$=8.17 (deg.), $\theta s2$=2.46 (deg.), Dm2=4.97 (mm), and Ds2=1.48 (mm).

The conditions of an example 3 are illustrated in FIG. 14C as follows: $\theta m$=31.50 (deg.), $\theta s$=8.50 (deg.), L1=15.00 (mm), Dm1=2.90 (mm), Ds1=2.22 (mm), $\theta m1$=11.04 (deg.), $\theta s1$=8.46 (deg.), and L2=25.00 (mm).

$\Delta$ was calculated by changing $\theta m2$ and $\theta s2$, and then the relationships among Jm, Js, and $\Delta$ were obtained. The results are listed in FIG. 17.

The dimensions of the opening portion B that cause Jm and Js to fall in the range of −0.085 to +0.085 are as follows: Dm2 is from 4.17 to 7.17 (mm), and Ds2 is from 1.18 to 4.15 (mm).

When Jm=Js=0, $\theta m2$=12.93 (deg.), $\theta s2$=6.11 (deg.), Dm2=5.67 (mm), and Ds2=2.67 (mm).

The conditions of an example 4 are illustrated in FIG. 14D as follows: $\theta m$=7.00 (deg.), $\theta s$=7.00 (deg.), L1=15.00 (mm), Dm1=5.60 (mm), Ds1=1.18 (mm), $\theta m1$=21.15 (deg.), $\theta s1$=4.50 (deg.), and L2=25.00 (mm).

$\Delta$ was calculated by changing $\theta m2$ and $\theta s2$, and then the relationships among Jm, Js, and $\Delta$ were obtained. The results are listed in FIG. 18.

The dimensions of the opening portion B that cause Jm and Js to fall in the range of −0.085 to +0.085 are as follows: Dm2 is from 3.42 to 4.91 (mm), and Ds2 is from 2.04 to 3.52 (mm).

When Jm=Js=0, $\theta m2$=9.53 (deg.), $\theta s2$=6.36 (deg.), Dm2=4.17 (mm), and Ds2=2.78 (mm).

In the range in which both Jm and Js are within in the range of −0.085 to +0.085, the absolute value of Δ is 3% or smaller in all of the examples.

Jm and Js are the parameters found by the inventor. The use of Jm and Js as indexes can reduce Δ so as to improve detection accuracy of a light amount.

Setting Jm and Js in the range of −0.085 to +0.085 makes design easier. In addition to this range, different combinations of Jm and Js are acceptable from a light detection accuracy point of view. These combinations correspond to the regions in which the absolute value of A is three (%) or smaller in FIGS. 15 to 18. Within the regions, the opening portion A and the opening portion B are actually equivalent in relation to a light beam from the light source.

If a light amount reaching the photoreceptor 18 is too small, detection accuracy lowers. A sufficient detection light amount can be ensured by enlarging the opening portion B in the range (within ±3%) in which Δ is not too large while the effect of divergence angle fluctuation is suppressed.

Referring back to FIG. 2, the cylindrical lens 31 makes a light beam after passing through the opening portion A, that is, the light beam output from the light source device 10 form into an image near the deflection reflection surface of the polygon mirror 33 in the Z-axis direction.

An optical system arranged on an optical path between the light source 11 and the polygon mirror 33 is also referred to as a pre-deflector optical system. In the present embodiment, the pre-deflector optical system includes the cover glass 22, the half mirror 23, the coupling lens 13, the first opening plate 14, and the cylindrical lens 31.

As an example, the polygon mirror 33 includes a six-sided mirror having an inscribed circle radius of 25 millimeters in which each mirror serves as a deflection reflecting surface. The polygon mirror 33 deflects the light beams from the cylindrical lens 31 while rotating at a constant speed around an axis parallel to the Z-axis direction.

The scanning lens 35 of deflector side is arranged on the optical path of the light beam deflected by the polygon mirror 33.

The scanning lens 36 of image surface side is arranged on the optical path of the light beam passed through the scanning lens 35 of deflector side. The light beam passed through the scanning lens 36 of image surface side is emitted on the surface of the photosensitive drum 1030, and a light spot is formed thereon. The light spot moves in the longitudinal direction of the photosensitive drum 1030 according to the rotation of the polygon mirror 33. In other words, the light spot scans the photosensitive drum 1030. In this process, the movement direction of the light spot is a "main-scanning direction". The rotation direction of the photosensitive drum 1030 is a "sub-scanning direction".

The optical system arranged on the optical path at a position between the polygon mirror 33 and the photosensitive drum 1030 is also called a scanning optical system. In the present embodiment, the scanning optical system is constituted by the deflector side-scanning lens 35 and the image surface side-scanning lens 36. At least one reflecting mirror may be arranged on at least one of the optical path between the scanning lens 35 of deflector side and the scanning lens 36 of image surface side and the optical path between the scanning lens 36 of image surface side and the photosensitive drum 1030.

A part of the light beams before writing starts among the light beams that have been deflected by the polygon mirror 33 and have passed through the scanning optical system enters the photodetection sensor 38a via the photodetection mirror 37a. A part of the light beams after writing is finished among the light beams that have been deflected by the polygon mirror 33 and have passed through the scanning optical system enters the photodetection sensor 38b via the photodetection mirror 37b.

Each of the photodetection sensors outputs a signal depending on the amount of received light (a photoelectric conversion signal).

Figure 19:
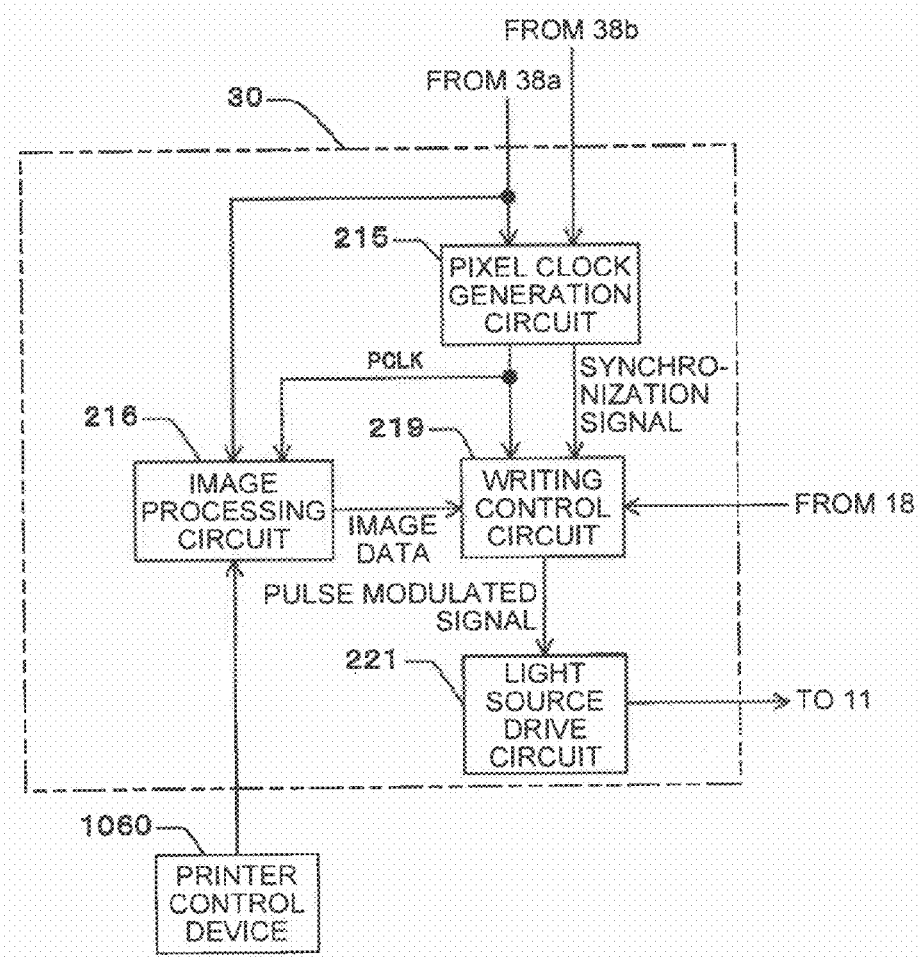
FIG. 19 is a block diagram of a light source control device illustrated in FIG. 3.

As illustrated in FIG. 19 as one example, the light source control device 30 includes a pixel clock generation circuit 215, an image processing circuit 216, a writing control circuit 219, and a light source driving circuit 221. Arrows illustrated in FIG. 19 indicate representative signals or information flow and do not indicate the whole connection relationship of each block.

The pixel clock generation circuit 215 determines a time required for a light beam to scan between the photodetection sensors using an output signal of the photodetection sensor 38a and an output signal of the photodetection sensor 38b, sets a frequency so that a preset number of pulses is placed within the time, and thus generates a pixel clock signal PCLK of the frequency. Thus generated pixel clock signal PCLK is supplied to the image processing circuit 216 and the writing control circuit 219. The output signal of the photodetection sensor 38a is output to the writing control circuit 219 as a synchronization signal.

The image processing circuit 216 subjects image information received from the upper-level device via the printer control device 1060 to raster development, subjects the information to predetermined halftone processing and similar processing, and then produces image data representing tone of each image by each light-emitting element based on the pixel clock signal PCLK. The image processing circuit 216 detects the start of scanning based on the output signal of the photodetection sensor 38a and then outputs the image data to the writing control circuit 219 in synchronization with the pixel clock signal PCLK.

The writing control circuit 219 produces a pulse modulated signal based on image data from the image processing circuit 216, and the pixel clock signal PCLK and a synchronization signal from the pixel clock generation circuit 215. The writing control circuit 219 also corrects a driving current for each light-emitting element with predetermined timing based on an output signal of the photoreceptor 18 so as to control a light amount of a light beam passing through the opening portion A to be a desired value. In other words, the writing control circuit 219 carries out an auto power control (APC).

The light source driving circuit 221 drives each light-emitting element of the two-dimensional array light-emitting device 100 based on the pulse modulated signal from the writing control circuit 219.

As is apparent from the description described above, the laser printer 1000 in the present embodiment includes the light source device 10. The half mirror 23 is structured as a splitting element.

As described above, the light source device 10 according to the present embodiment includes the light source 11, the coupling lens 13, the first opening plate 14, the second opening plate 16, the photoreceptor 18, the package member 21, the cover glass 22, the half mirror 23, and the light source control device 30.

In addition, the relationships $|(\theta m1-\theta m2)/\theta m| \leq 0.085$ and $|(\theta s1-\theta s2)/\theta s| \leq 0.085$ are satisfied in the main-scanning corresponding direction and the sub-scanning corresponding direction where $\theta m$ and $\theta s$ are the divergence angles of a light beam output from the light source, $\theta m1$ and $\theta s1$ are the emission angles of the light beam passing through the opening portion A, and θm2 and θs2 are the emission angles of the light beam passing through the opening portion B.

In this case, the absolute value of Δ is three (%) or smaller, Δ being corresponding to the change rate of the ratio of the light use efficiency of the first opening plate 14 to the light use efficiency of the second opening plate 16 when the divergence angle of a light beam output from the light source 11 changes by 10%.

In the spatial light intensity distributions of light beams passing through the opening portions of the opening plates, the relationships P1≈P3 and P2≈P4 are satisfied.

As a result, the device can be downsized without lowering light detection accuracy.

Furthermore, the optical scanning device 1010 according to the present embodiment can carry out optical scanning on the surface of the photosensitive element 1030 with high accuracy because the optical scanning device 1010 includes the light source device 10.

Furthermore, multiple scanning can be performed simultaneously because the light source 11 includes a plurality of light-emitting elements. As a result, high speed image forming can be achieved.

Furthermore, the laser printer 1000 according to the present embodiment can form high quality images because the laser printer 1000 includes the optical scanning device 1010.

In addition, higher density images can be achieved because the light source 11 includes a plurality of light-emitting elements.

Figure 20:
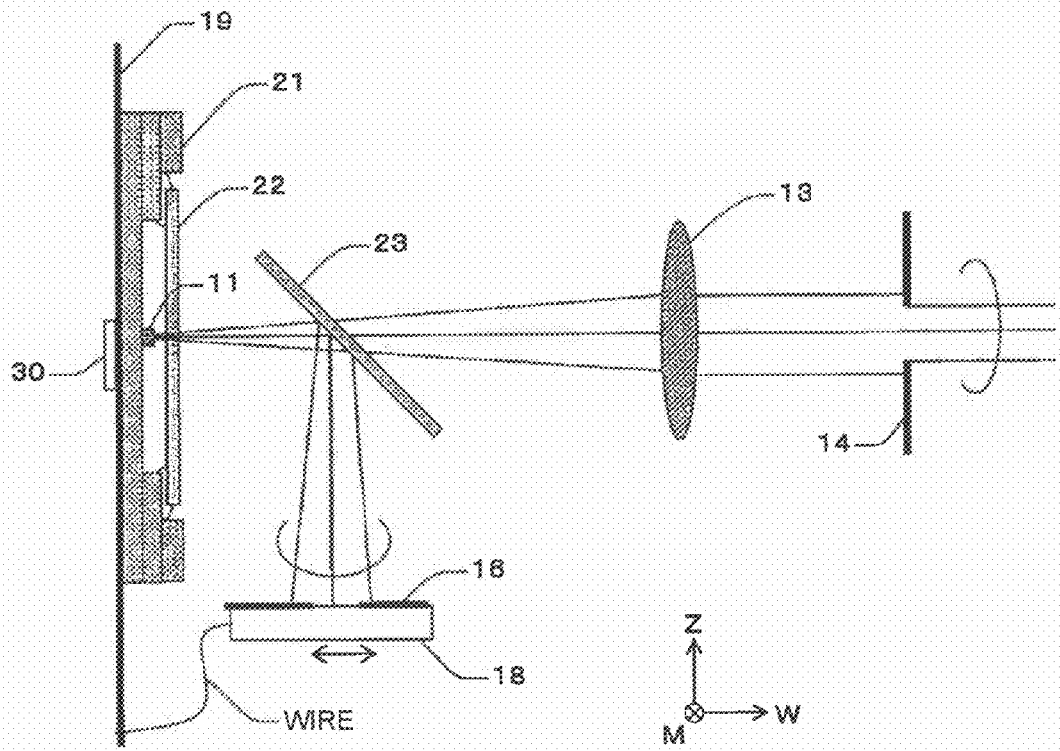
FIG. 20 is a schematic diagram of a first modified embodiment of the light source device.
Figure 21:
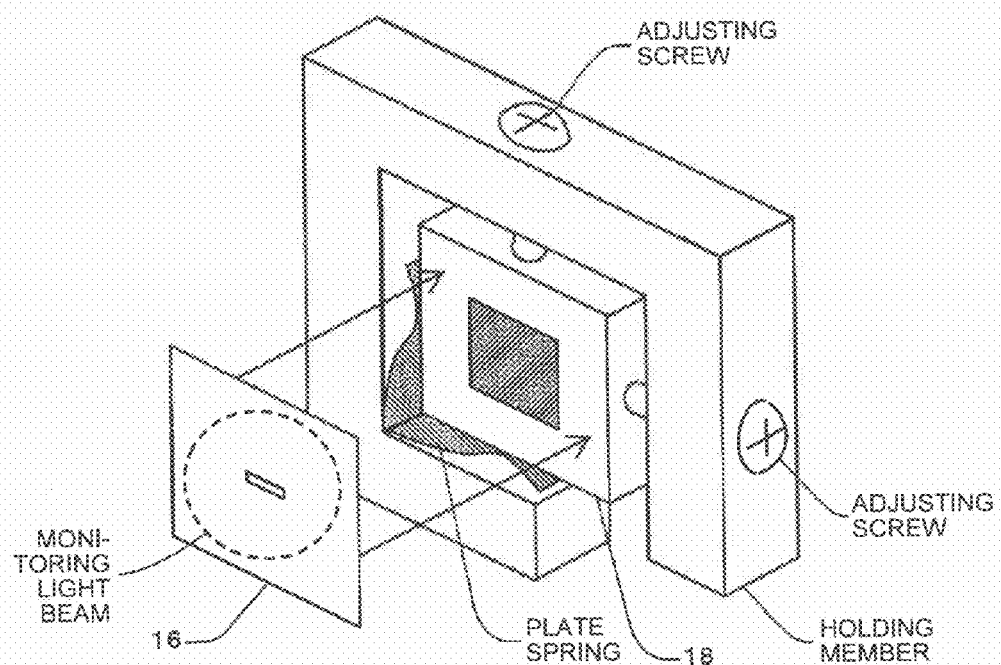
FIG. 21 is a schematic diagram of a positioning mechanism for the second opening plate of the light source device of FIG. 20.

In the embodiment, the second opening plate 16 and the photoreceptor 18 may be integrated as illustrated in FIG. 20 as one example. In this case, the positioning mechanism may include: a frame-like holding member that surrounds the periphery of the photoreceptor 18; a plate spring that is inserted between the photoreceptor 18 and the inner wall of the holding member and that applies pressing force to the photoreceptor 18 in the −M direction and the +W direction; and two adjusting screws that are installed in the holding member so as to be opposed to the plate spring and that make the photoreceptor 18 move in the M direction and the W direction. In this mechanism, the positions of the photoreceptor 18 and the second opening plate 16 are adjusted depending on the inserted amount of the two adjusting screws.

In the embodiment, a light detection effective range of the photoreceptor 18 may be a substitute for the opening portion of the second opening plate 16. This eliminates the need for the second opening plate 16, thereby reducing the number of parts.

Figure 22:
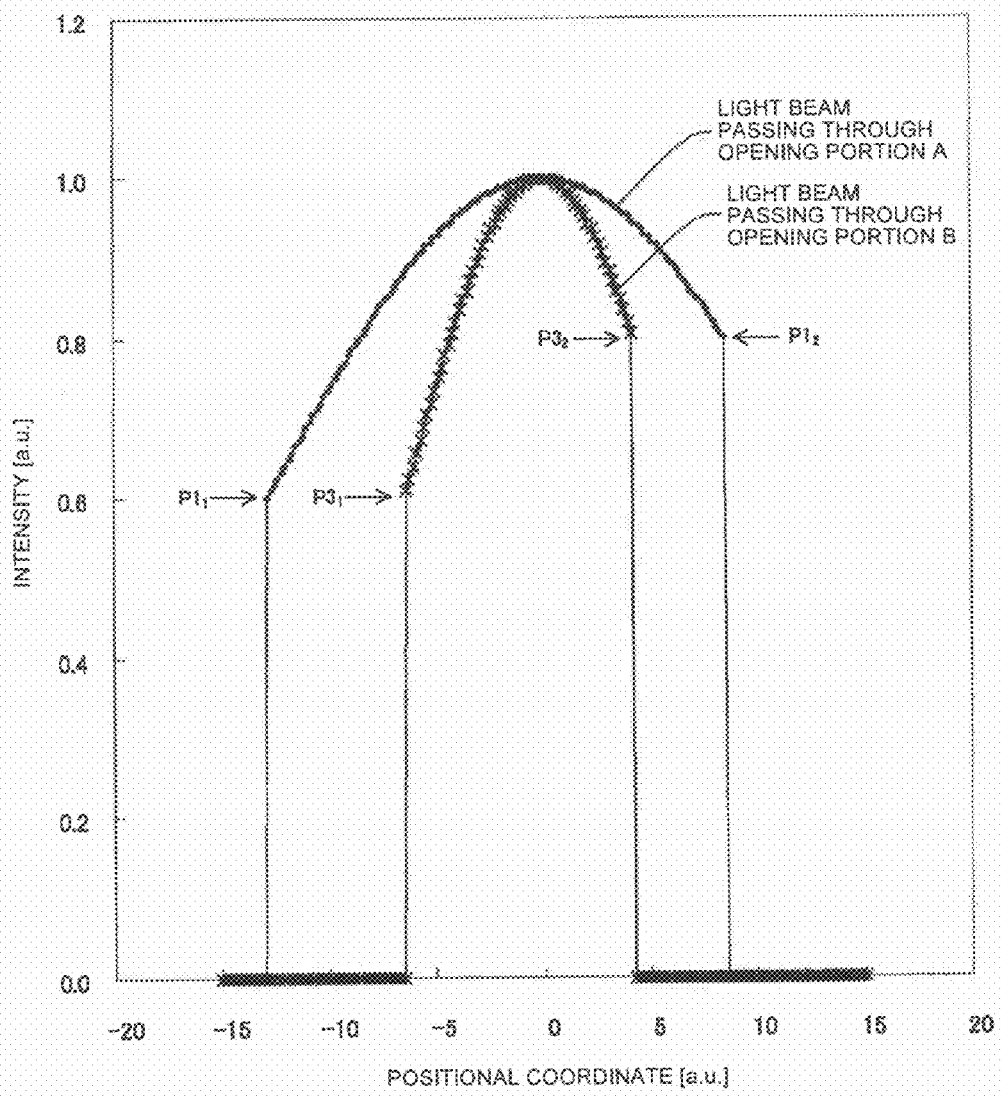
FIG. 22 is a graph explaining a modified embodiment of spatial light intensity distributions of a light beam after passing through the opening portion A and a light beam after passing through the opening portion B.

In the embodiment described above, the case where the peak position of the light intensity corresponds to the center of the opening portion is described, but it is not limited thereto. The center of the light beam may be decentered relative to the opening portion, and the peak position of the light intensity may be displaced from the center of the opening portion. In this case, when the horizontal axis represents a positional coordinate in the main-scanning corresponding direction, the light intensities of the light beam passing through the opening portion A at the negative end and at the positive end are indicated by $P1_1$ and $P1_2$, respectively. The light intensities of the light beam passing through the opening portion B at the negative end and at the positive end are indicated by $P3_1$ and $P3_2$, respectively. As illustrated in FIG. 22, all that is required is that the relationships of $P1_1 \approx P3_1$ and $P1_2 \approx P3_2$ are satisfied.

When the horizontal axis represents a positional coordinate in the sub-scanning corresponding direction, the light intensities of the light beam passing through the opening portion A at the negative end and at the positive end are indicated by $P2_1$ and $P2_2$, respectively. The light intensities of the light beam passing through the opening portion B at the negative end and at the positive end are indicated by $P4_1$ and $P4_2$, respectively. In this case, all that is required is that the relationships of $P2_1 \approx P4_1$ and $P2_2 \approx P4_2$ are satisfied.

In the embodiment, instead of the coupling lens 13, a coupling optical system composed of a plurality of lenses may be employed.

While a parallel light beam is output from the coupling lens in the embodiment, the light emission form is not limited thereto. A diverging light beam or a convergent light beam may be output from the coupling lens depending on the structure of the optical scanning device.

While the coupling lens 13 is rotationally symmetric in the embodiment, the shape of the coupling lens 13 is not limited thereto. For example, when the coupling lens 13 is anamorphic, the shape of the opening portion of each opening plate may be set so as to satisfy the above-described "light intensity equivalence relation" in consideration of a power ratio of the M direction to the Z-axis direction.

Figure 23:
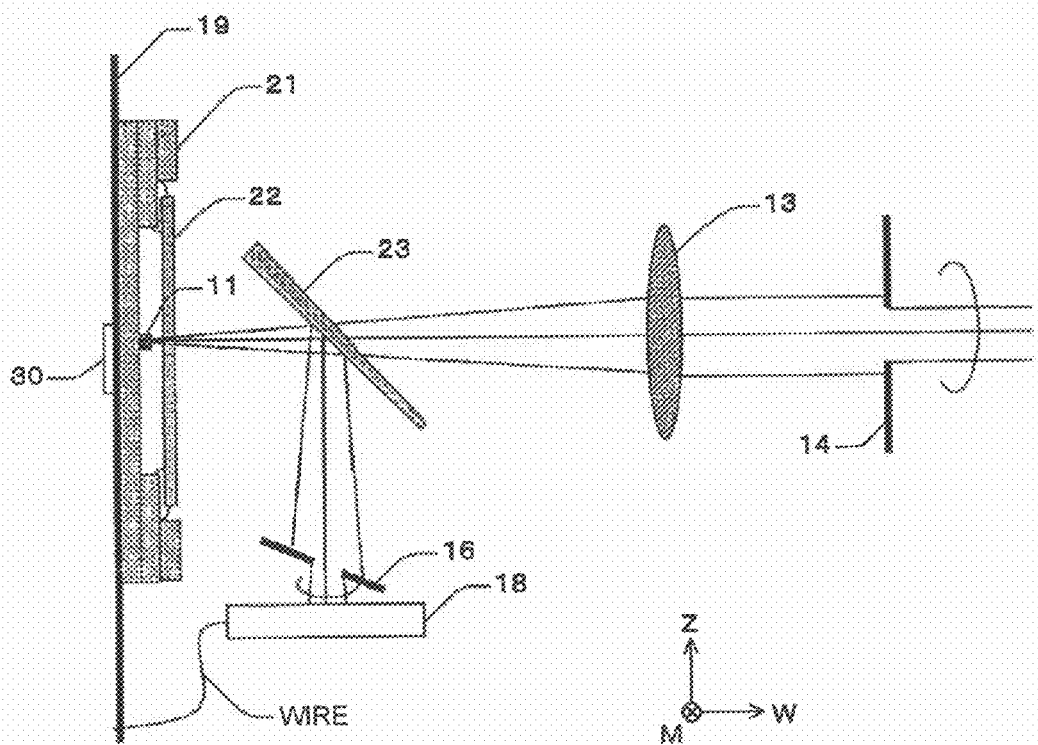
FIG. 23 is a schematic diagram of a second modified embodiment of the light source device.

The case where one surface of the half mirror 23 and the other surface thereof are parallel to each other is described in the embodiment described above, but it is not limited thereto. As illustrated in FIG. 23 as one example, one surface of the half mirror 23 may be nonparallel to the other surface thereof. This structure can inhibit interference of the light beam reflected by the incident surface of the half mirror 23 and the light beam reflected by the emitting surface of the half mirror 23 from occurring on the receiving surface of the photoreceptor 18. As a result, detection accuracy of the light amount can be further enhanced. Moreover, this structure can inhibit the light beam repeatedly reflected inside of the half mirror 23 from causing interference on the surface to be scanned. As a result, the light intensity on the surface to be scanned can be further stabilized.

In the embodiment, the second opening plate 16 may be inclined or curved with respect to the MW plane as illustrated in FIG. 23 as one example. This structure can prevent a light reflected around the opening portion of the second opening plate 16 from returning to the light source 11. In this case, all that is required is that the shape obtained by projecting the opening portion of the second opening plate 16 onto the MW plane will satisfy the "light intensity equivalence relation".

Likewise, the first opening plate 14 may be inclined or curved with respect to the MZ plane. This structure can prevent a light reflected around the opening portion of the first opening plate 14 from returning to the light source 11. In this case, all that is required is that the shape obtained by projecting the opening portion of the first opening plate 14 onto the MZ plane will satisfy the "light intensity equivalence relation".

Figure 24:
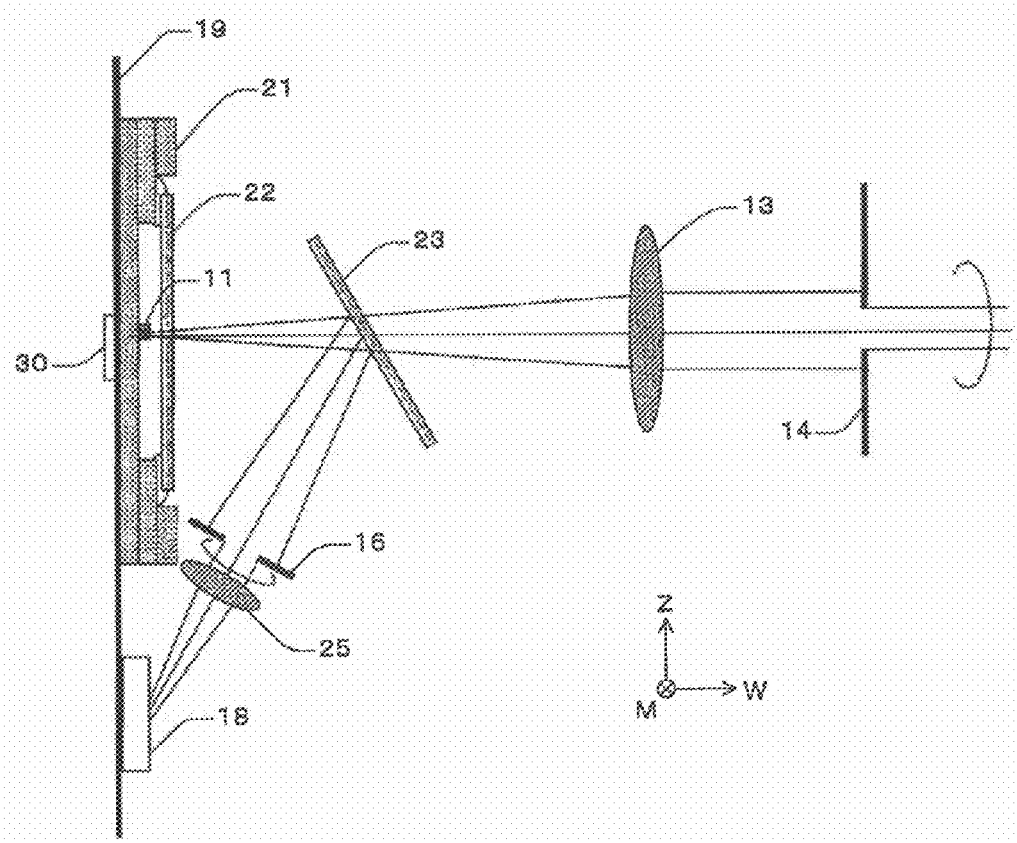
FIG. 24 is a schematic diagram of a third modified embodiment of the light source device.

As illustrated in FIG. 24 as one example, in the embodiment, a condensing lens 25 may be arranged between the second opening plate 16 and the photoreceptor 18. This structure enables the size of the receiving surface of the photoreceptor 18 to be reduced. Moreover, this structure may also include an adjusting mechanism for positioning the condensing lens 25. The adjustment of the position of the condensing lens 25 enables the incidence position and the focus position of a light beam to be adjusted relative to the receiving surface.

The case where the surface of the half mirror 23 is inclined 45 degrees with respect to the MZ plane is described in the embodiment described above, but it is not limited thereto. For example, as illustrated in FIG. 24, the inclined angle of the surface of the half mirror 23 with respect to the MZ plane may be smaller than 45 degrees.

With this structure, the photoreceptor 18 can be arranged on the circuit board 19, which eases assembling at the downstream operations. Fluctuation in reflectivity and transmittance of the half mirror 23 resulting from fluctuation in the polarization direction of the light beam output from the light source 11 can be reduced because the incidence angle of the light beam output from the light source 11 on the half mirror 23 becomes small. As a result, light amount detection error among a plurality of light-emitting elements can be reduced.

Figure 25:
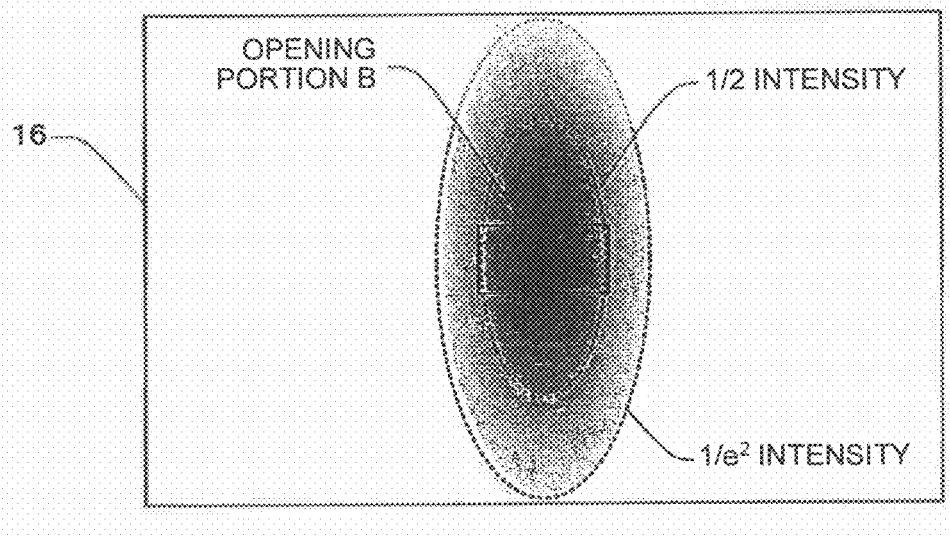
FIG. 25 is a graph explaining a modified embodiment of a relationship between the opening portion of the second opening plate and a monitoring light beam.

In the embodiment, the light intensity distribution on the second opening plate 16 may differ from the light intensity distribution on the first opening plate 14 (refer to FIG. 25). For example, the light intensity distribution on the second opening plate 16 differs from the light intensity distribution on the first opening plate 14 when the second opening plate 16 is inclined with respect to the MW plane while the first opening plate 14 is in parallel with the MZ plane. The light intensity distribution on the second opening plate 16 also differs from the light intensity distribution on the first opening plate 14 when an optical system is provided between the half mirror 23 and the second opening plate 16 and the power ratio of the main-scanning corresponding direction to the sub-scanning corresponding direction differs between the optical system and the coupling lens. In such cases, in short, all that is required is that "the light intensity equivalence relation" will be satisfied.

While the opening portion of each opening plate is rectangular in the embodiment, the shape of the opening portion is not limited thereto. For example, the opening portion of each opening plate may be elliptical.

While the two-dimensional array light-emitting device 100 includes forty light-emitting elements in the embodiment, the two-dimensional array light-emitting device 100 is not limited thereto.

While the light source 11 includes the two-dimensional array light-emitting device 100 in the embodiment, the light source 11 is not limited thereto. For example, the light source 11 may include a one-dimensional array in which a plurality of light-emitting elements is arranged in a line instead of the two-dimensional array light-emitting device 100. The light source 11 may include one light-emitting element instead of the two-dimensional array light-emitting device 100.

While the monitoring optical system is included in the light source device in the embodiment, the structure is not limited thereto. At least part of the monitoring optical system may be provided separately from the light source device.

Figure 26:
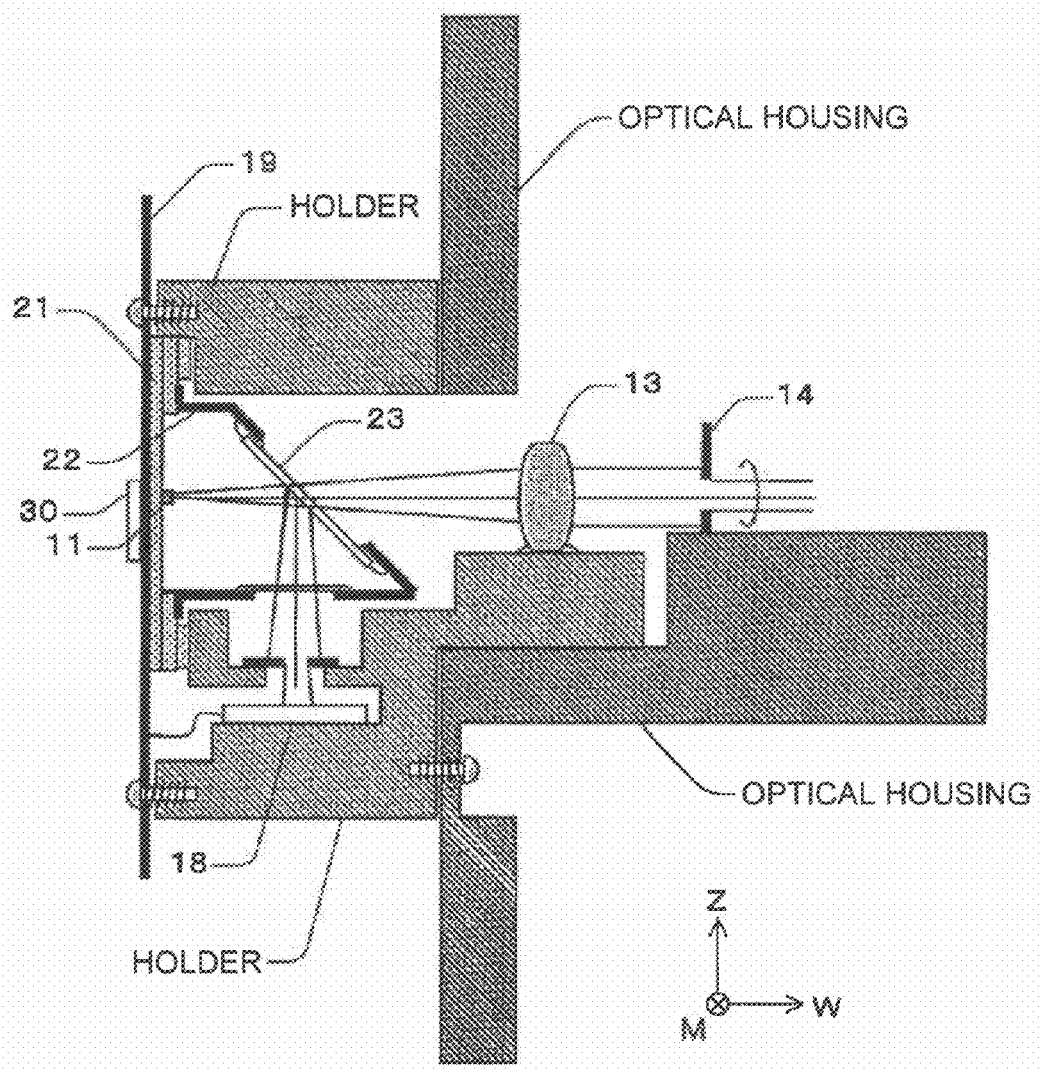
FIG. 26 is a schematic diagram explaining a state where the light source device is installed in an optical housing.

In the embodiment, the half mirror 23 may be held with a cap member that seals the light source 11 (refer to FIG. 26). This eliminates the need for the cover glass 22. FIG. 26 illustrates a state in which the light source device 10 structured as described above is installed in an optical housing. Aluminum die casting holder holds the coupling lens 13, the second opening plate 16, and the photoreceptor 18 in a predetermined positional relationship. The holder is engaged with the circuit board 19 with screws.

With this structure, the reference surface of the package member 21 abuts the holder in the M direction, the W direction, and the Z-axis direction to be positioned.

The position of the coupling lens 13 is adjusted so that the positional relationship with the light source 11 and the state of a writing light beam become desired states. Subsequently, the coupling lens 13 is bonded to the holder using a photo curing resin adhesive.

The photoreceptor 18 is inserted and fixed to the holder and is connected to the circuit board 19.

The second opening plate 16 is adjusted to a desired position while the photoreceptor 18 receives the light output from the light source 11, and then is held with a holding mechanism (not illustrated).

The optical housing may be made of either aluminum die casting or resin molding.

The holder is engaged with the optical housing with screws. In this structure, the holder is rotatable around an axis parallel to the W direction in order to adjust the posture of the light source 11 relative to the scanning optical system mounted on the optical housing to a desired state.

The first opening plate 14 is held on the optical housing. The first opening plate 14 may be integrally held on the holder in order to enhance positional accuracy with the light source 11 and the coupling lens 13. In this case, attention is required to the deterioration of a beam spot diameter because the first opening plate 14 is also eccentric from the optical system on the optical housing by rotationally adjusting the holder.

Figure 27:
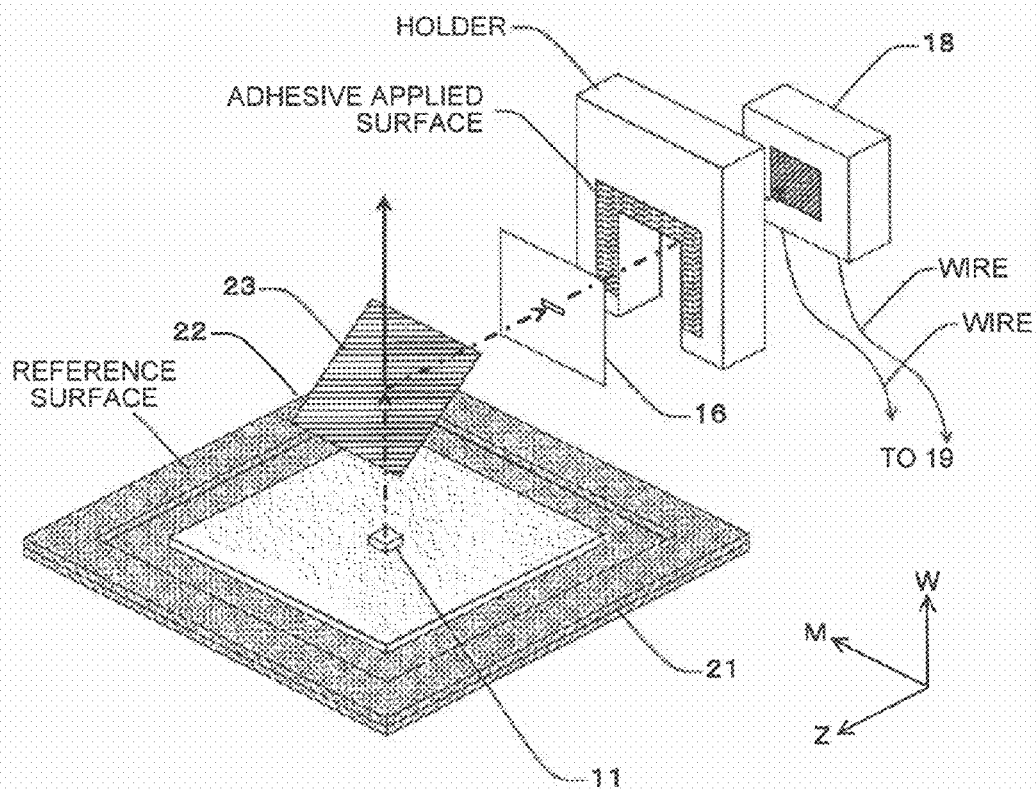
FIG. 27 is a schematic diagram (1) explaining assembly of the light source device.
Figure 28:
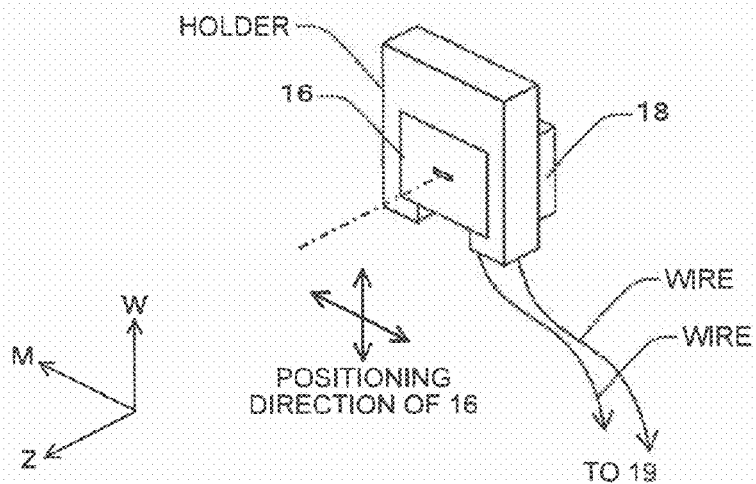
FIG. 28 is a schematic diagram (2) explaining assembly of the light source device.

As illustrated in FIGS. 27 and 28, an adhesive (such as an ultraviolet curable resin adhesive) can be applied to the surface of the holder where the second opening plate 16 is installed, and the second opening plate 16 can be positioned by holding the plate with an adjustment jig or in a similar manner and then be bonded to the holder. Thus, the optical scanning device can exclude the positioning mechanism. Therefore, this structure enables downsizing, weight reduction, and cost reduction of the device.

The case where the image forming apparatus is the laser printer 1000 is described in the embodiment described above, but it is not limited thereto. To put it briefly, the image forming apparatus may at least include the optical scanning device 1010.

For example, the image forming apparatus may be an image forming apparatus directly radiating laser light onto a medium (such as paper) coloring by the laser light.

The image forming apparatus may be an image forming apparatus in which a silver-salt film is used as an image carrier. In this case, a latent image is formed on the silver-salt film by optical scanning, and the latent image can be visualized by a process same as a development process in a common silver halide photography process. The image can be transferred onto photographic paper by a process same as a printing process in a common silver halide photography process. Such image forming apparatuses can serve as an optical plate-making device or an optical drawing device for drawing CT scan images or the like.

Figure 29:
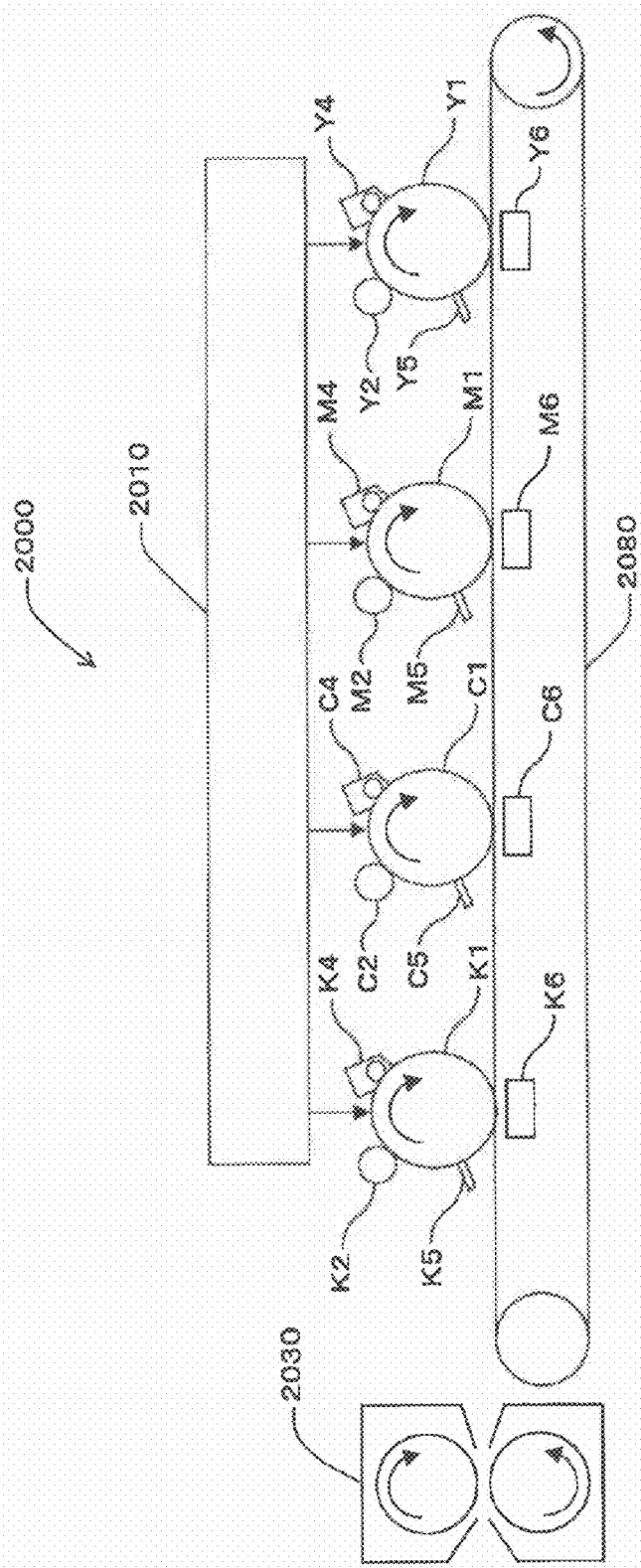
FIG. 29 is a schematic diagram of a color printer.

For example, as illustrated in FIG. 29, the image forming apparatus may be a color printer 2000 including a plurality of photosensitive drums.

The color printer 2000 is a tandem multiple color printer that forms images in full color by superimposing four colors (black, cyan, magenta, and yellow). The color printer 2000 includes: for example, "a photosensitive drum K1, a charging unit K2, a developing unit K4, a cleaning unit K5, and a transfer unit K6" for black; "a photosensitive drum C1, a charging unit C2, a developing unit C4, a cleaning unit C5, and a transfer unit C6" for cyan; "a photosensitive drum M1, a charging unit M2, a developing unit M4, a cleaning unit M5, and a transfer unit M6" for magenta; "a photosensitive drum Y1, a charging unit Y2, a developing unit Y4, a cleaning unit Y5, and a transfer unit Y6" for yellow; an optical scanning device 2010, a transfer belt 2080, and a fixing unit 2030.

The photosensitive drums rotate in the corresponding arrow directions in FIG. 29. The charging unit, the developing unit, the transfer unit, and the cleaning unit are arranged around each photosensitive drum in its rotation direction.

Each of the charging units uniformly charges the surface of the corresponding photosensitive drum. The optical scanning device 2010 optically scans the surface of each photosensitive drum charged by the charging unit to form a latent image on the photosensitive drum.

The corresponding developing unit forms a toner image on the surface of the photosensitive drum. Subsequently, the corresponding transfer unit sequentially transfers the toner image in each color onto a recording sheet on the transfer belt 2080, and finally, the fixing unit 2030 fixes the image on the recording sheet.

The optical scanning device 2010 includes a light source device similar to the light source device 10 for each color. Accordingly, the optical scanning device 1010 can obtain effects similar to those obtained in the optical scanning device 1010.

As a result, the color printer 2000 can obtain effects similar to those obtained in the laser printer 1000.

Although the tandem multiple color printer may cause color deviation in each color due to factors related to machine accuracy or the like, accuracy in correcting color deviation in each color can be enhanced by selecting the light-emitting element to be lighted.

The color printer 2000 may include an optical scanning device per color or per two colors.

The light source device according to a first aspect of the present invention can be downsized without lowering light detection accuracy.

The optical scanning device according to a second aspect of the present invention includes the light source device according to the first aspect of the present invention and thus can carry out high precision optical scanning.

The image forming apparatus according to a third aspect of the present invention includes the optical scanning device according to the second aspect of the present invention and thus can form high quality images.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device comprising:
    a light source;
    a splitting element that is arranged on an optical path of a light beam output from the light source and splits the light beam into a first light beam and a second light beam;
    a first opening plate that is arranged on an optical path of the first light beam split by the splitting element, has a first opening portion, and shapes the first light beam; and
    a second opening plate that is arranged on an optical path of the second light beam split by the splitting element, has a second opening portion having a shape different from a shape of the first opening portion, and shapes the second light beam, wherein
    states of light beams entering the first opening plate and the second opening plate are different from each other, and
    relationships $|(\theta 11-\theta 12)/\theta 1|\leqq 0.085$ and $|(\theta 21-\theta 22)/\theta 2|\leqq 0.085$ are satisfied where:
    in relation to a first direction and a second direction that are orthogonal to each other in a plane orthogonal to a traveling direction of a light beam output from the light source, $\theta 1$ denotes a divergence angle of the light beam in the first direction, $\theta 2$ denotes a divergence angle of the light beam in the second direction,
    $\theta 11$ denotes an emission angle at the light source in the first direction of a light beam passing through the first opening portion, $\theta 21$ denotes an emission angle at the light source in the second direction of the light beam passing through the first opening portion,
    $\theta 12$ denotes an emission angle at the light source in the first direction of a light beam passing through the second opening portion, and $\theta 22$ denotes an emission angle at the light source in the second direction of the light beam passing through the second opening portion.

2. The light source device according to claim 1, wherein relationships P1≈P3 and P2≈P4 are satisfied where:
    in a spatial light intensity distribution of a light beam after passing through the first opening portion, P1 denotes a light intensity relating to a maximum light intensity at an end in a direction corresponding to the first direction in a plane orthogonal to a traveling direction of the light beam, P2 denotes a light intensity relating to a maximum light intensity at an end in a direction corresponding to the second direction in the plane orthogonal to the traveling direction of the light beam, and
    in a spatial light intensity distribution of a light beam after passing through the second opening portion, P3 denotes a light intensity relating to a maximum light intensity at an end in a direction corresponding to the first direction in a plane orthogonal to a traveling direction of the light beam, and P4 denotes a light intensity relating to a maximum light intensity at an end in a direction corresponding to the second direction in the plane orthogonal to the traveling direction of the light beam.

3. The light source device according to claim 1, further comprising:
    a first optical system that is arranged on an optical path between the light source and the first opening plate; and
    a second optical system that is arranged on an optical path between the splitting element and the second opening plate, wherein
    the first optical system has equal optical power both in the first direction and the second direction,
    the second optical system has equal optical power both in a direction corresponding to the first direction and a direction corresponding to the second direction, and
    a shape obtained by projecting the first opening portion onto a plane orthogonal to a traveling direction of a light beam passing through the first opening portion and a shape obtained by projecting the second opening portion onto a plane orthogonal to a traveling direction of a light beam passing through the second opening portion are similar to each other.

4. The light source device according to claim 1, wherein the splitting element is a plate-like member whose one surface is parallel to another surface.

5. The light source device according to claim 1, wherein the splitting element is a plate-like member whose one surface is nonparallel to another surface.

6. The light source device according to claim 1, further comprising a photoreceptor that receives the light beam passing through the second opening portion, wherein the second light beam is a light beam for monitoring a light amount.

7. The light source device according to claim 6, further comprising an opening plate positioning mechanism that adjusts a position of the second opening plate in a plane orthogonal to a traveling direction of the second light beam split by the splitting element.

8. The light source device according to claim 6, further comprising a condensing lens that is arranged on an optical path between the second opening portion and the photoreceptor.

9. The light source device according to claim 8, further comprising a lens positioning mechanism for positioning the condensing lens.

10. An optical scanning device that scans a surface to be scanned with a light beam in a main-scanning direction, the optical scanning device comprising:

the light source device according to claim 1;

a deflector that deflects the light beam output from the light source device; and a scanning optical system that condenses the light beam deflected by the deflector on the surface to be scanned.

11. The optical scanning device according to claim 10, wherein a length of the first opening portion included in the light source device in the main-scanning direction is larger than a length of the first opening portion in a direction orthogonal to the main-scanning direction, and the splitting element included in the light source device is inclined around an axis parallel to the main-scanning direction.

12. An image forming apparatus comprising:

at least one image carrier; and at least one optical scanning device according to claim 10 that scans the at least one image carrier using a light beam modulated according to image information.

13. The image forming apparatus according to claim 12, wherein the image information is multiple color image information.

* * * * *